Figure 1:
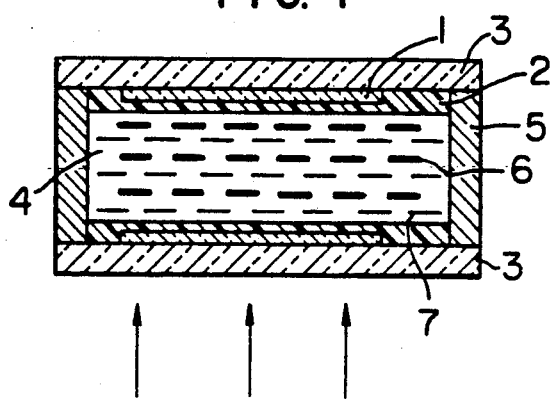

United States Patent [19]

Kaneko et al.

[11] Patent Number: 5,026,505
[45] Date of Patent: Jun. 25, 1991

[54] GUEST-HOST TYPE LIQUID CRYSTAL COMPOSITION

[75] Inventors: Masaharu Kaneko, Yamato; Tetsuo Ozawa, Tokyo; Tomio Yoneyama, Kawasaki; Shuji Imazeki, Hitachi; Akio Mukoh, Mito; Mikio Sato, Hitachi, all of Japan

[73] Assignees: Hitachi, Ltd.; Mitsubishi Kasei Corporation, both of Tokyo, Japan

[21] Appl. No.: 426,962

[22] Filed: Sep. 29, 1982

[30] Foreign Application Priority Data

Oct. 2, 1981 [JP] Japan ................. 56-156192

[51] Int. Cl.$^5$ ............................ C09K 19/00
[52] U.S. Cl. ......................... 252/299.1; 350/349
[58] Field of Search ............ 252/295.1; 350/349

[56] References Cited

U.S. PATENT DOCUMENTS

| | | | |
|---|---|---|---|
| 4,145,114 | 3/1979 | Coates et al. | 252/299.1 |
| 4,304,683 | 12/1981 | Morinaka et al. | 252/299.1 |
| 4,324,455 | 4/1982 | Imahori et al. | 252/299.1 |
| 4,348,298 | 5/1982 | Zaschke et al. | 252/299.1 |
| 4,356,102 | 10/1982 | Aftercut et al. | 252/299.1 |
| 4,358,392 | 11/1982 | Colnard et al. | 252/299.1 |
| 4,360,447 | 11/1982 | Morinach et al. | 252/299.1 |
| 4,363,743 | 12/1982 | Moeller et al. | 252/299.1 |
| 4,394,074 | 7/1983 | Brown et al. | 252/299.1 |
| 4,408,840 | 10/1983 | Imazeki et al. | 252/299.1 |
| 4,426,312 | 1/1984 | Claussem | 252/299.1 |
| 4,434,072 | 2/1984 | Imahori et al. | 252/299.1 |
| 4,454,057 | 6/1984 | Kaneko et al. | 252/299.1 |
| 4,455,253 | 6/1984 | Thompson | 252/299.1 |
| 4,456,545 | 6/1984 | Weber et al. | 252/299.1 |

FOREIGN PATENT DOCUMENTS

| | | | |
|---|---|---|---|
| 2104 | 5/1979 | European Pat. Off. | 252/299.1 |
| 26004 | 4/1981 | European Pat. Off. | 252/299.1 |
| 38460 | 10/1981 | European Pat. Off. | 252/299.1 |
| 65869 | 5/1982 | European Pat. Off. | 252/299.1 |
| 59036 | 9/1982 | European Pat. Off. | 252/299.1 |
| 67354 | 12/1982 | European Pat. Off. | 252/299.1 |
| 69257 | 1/1983 | European Pat. Off. | 252/299.1 |
| 2920730 | 11/1979 | Fed. Rep. of Germany | 252/299.1 |
| 3038372 | 5/1981 | Fed. Rep. of Germany | 252/299.1 |
| 57-34177 | 2/1982 | Japan | 252/299.1 |
| 57-85880 | 5/1982 | Japan | 252/299.1 |
| 57-92079 | 6/1982 | Japan | 252/299.1 |
| 2086409 | 5/1982 | United Kingdom | 252/299.1 |

OTHER PUBLICATIONS

Cox, R. J., Mol. Cryst. Liq. Cryst., vol. 55, pp. 1-32 (1979).

Primary Examiner—Robert L. Stoll
Assistant Examiner—Richard Treanor
Attorney, Agent, or Firm—Antonelli, Terry, Stout & Kraus

[57] ABSTRACT

A guest-host type liquid crystal composition comprising one or more host liquid crystals and dissolved therein one or more pleochroic dyes having a trans-4-substituted cyclohexyl group, preferably in an amount of 70% by mole or more of said trans-4-substituted cyclohexyl group among 4-substituted cyclohexyl groups, can afford a liquid crystal display device improved in display contrast and good stability due to no photochemical reaction of the liquid crystal composition.

41 Claims, 2 Drawing Sheets

GUEST-HOST TYPE LIQUID CRYSTAL COMPOSITION

This invention relates to a guest-host type liquid crystal composition usable in liquid crystal display devices possible to display in colors.

The guest-host type liquid crystal composition is a liquid crystal composition in which guest pleochroic dyes are dissolved in host liquid crystals. The pleochroic dyes are required to have high order parameters (S) in the host liquid crystals.

The order parameter is a quantitative measure of the degree of parallelism of absorption axis of the dye molecule to the orientation direction of the host liquid crystal molecules and its value governs a contrast of the display device. In the case of pleochroic dyes having parallel dichroism, the closer to 1 which is the theoretical maximum value said S value becomes, the smaller the degree of color retention of relatively colorless portion becomes, which makes possible bright and clear display with high contrast. The S values required for the pleochroic dyes vary depending on utility conditions of liquid crystal display devices using said dyes. Usually, it is preferable when the S value in the host liquid crystals suitable for the desired use takes 0.7 or more near room temperature.

Relationship between molecular structures of pleochroic dyes and their various properties has not been studied sufficiently. Thus, it is very difficult to select pleochroic dyes having higher S values among various dyes showing the desired hue. It is hard to deduce preferable pleochroic dye structures from known ones.

It is generally said that the S value of pleochroic dyes in the host liquid crystal becomes larger when the shape of the dye molecule becomes rod-like and longer. But even if various substituents are introduced into molecular structures in order to produce such longer dye molecules, there are very often brought about other disadvantages such as lowering in the solubility, lowering in the stability and the like.

Heretofore, the introduction of a phenyl group containing a normal alkyl group at the para-position into a dye molecule has been considered most effective for improving the S value with less lowering in the solubility of the dye. But it is also known that such a phenyl group participates in a photochemical reaction by an influence of oxygen. When such a reaction takes place in the display device, there bring about various undesirable phenomena such as degradation of the orientation of liquid crystal molecules, etc., due to intermediate reaction products and final reaction products, etc., which results in lowering in reliability of the display device. At present, organic sealing materials such as epoxy resins and the like are mainly used as sealing materials for the liquid crystal display device. The organic sealing materials are good in permeability of oxygen. Thus, when oxygen is permeated into the liquid crystal layer in the display device, there may naturally take place the above-mentioned photochemical reaction. Therefore, the introduction of other groups than the phenyl group mentioned above has been studied overcoming the disadvantages mentioned above.

It is an object of this invention to provide a guest-host type liquid crystal composition showing a high display contrast and excellent stability.

This invention provides a guest-host type liquid crystal composition which comprises one or more host liquid crystals, and
one or more pleochroic dyes which have trans-4-substituted cyclohexyl groups as substituent and are dissolved in said host liquid crystals.

Figure 4:
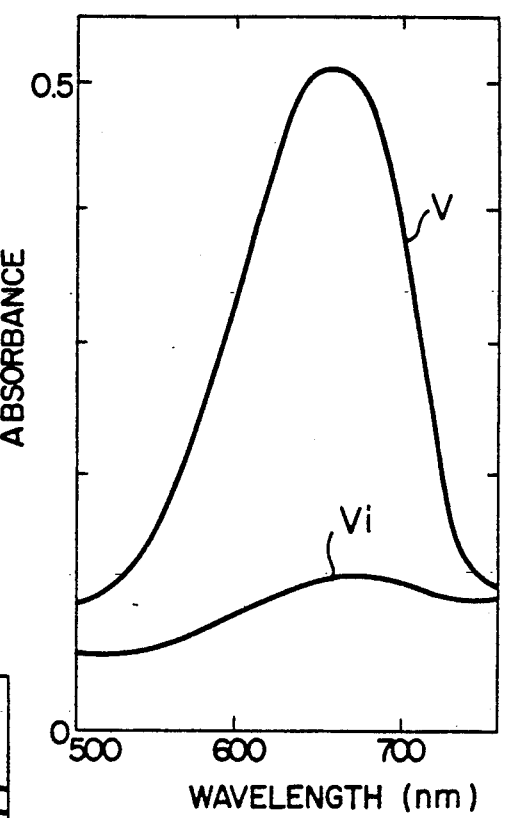
Figure 5:
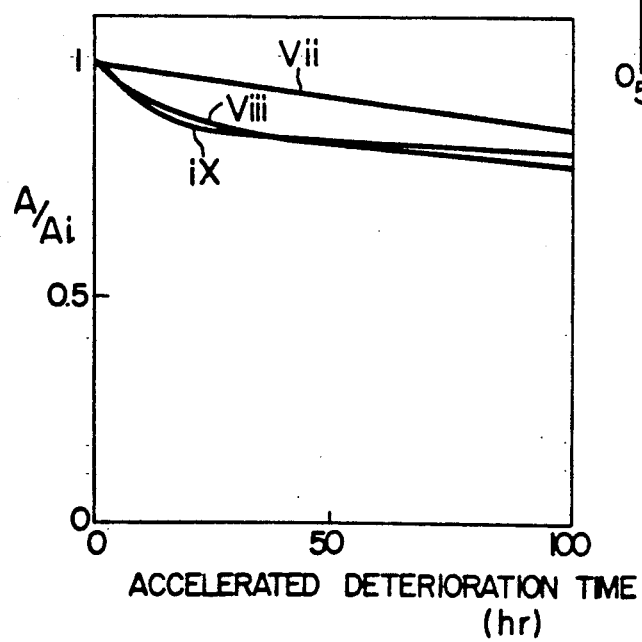
Figure 3:
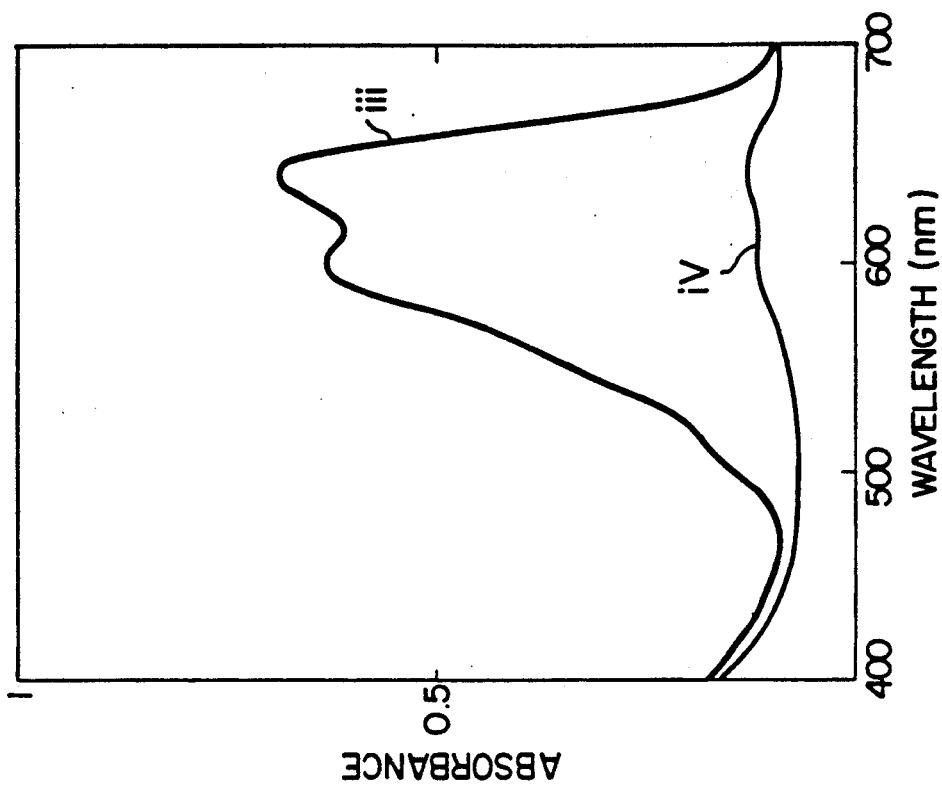
Figure 2:
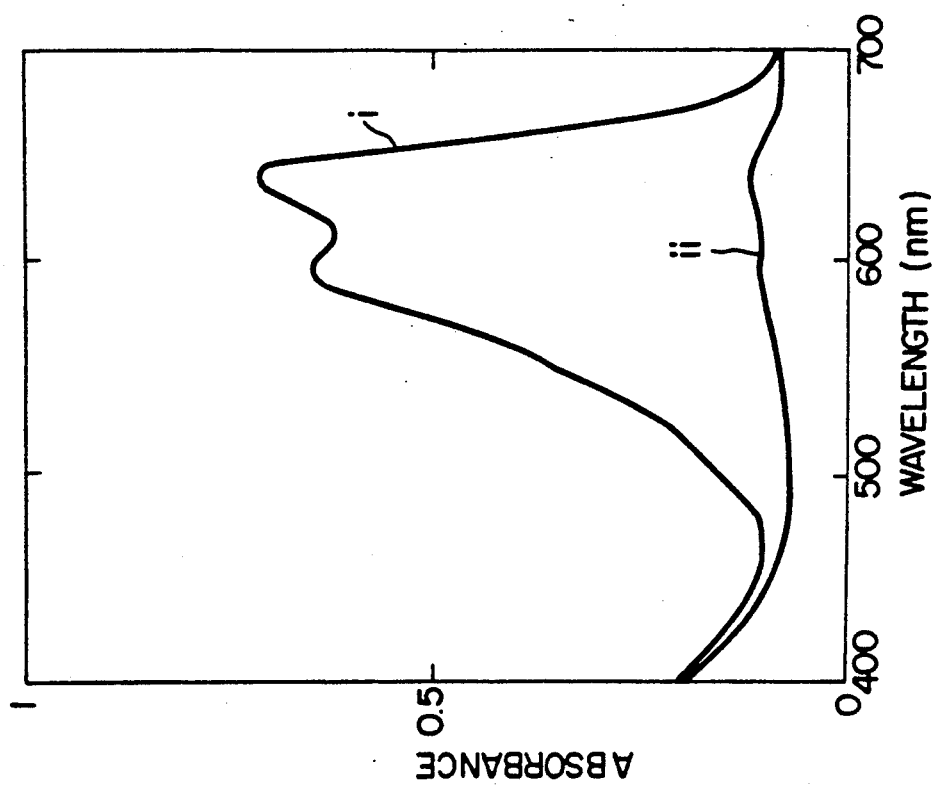

In the attached drawings,

FIG. 1 is a schematic sectional view of a liquid crystal display device used in an example of this invention, FIGS. 2 to 4 show spectral properties of liquid crystal compositions according to this invention, and FIG. 5 is a graph showing changes of absorbances with the lapse of time of liquid crystal compositions according to this invention and of prior art.

4-Substituted cyclohexyl groups can form two stereo isomers of trans isomer and cis isomer. Heretofore, for guest dyes in guest-host type liquid crystal composition, a mixture of cis isomer and trans isomer in about 1:1 weight ratio has been used without separation of individual isomers. After various studies, the present inventors found that the introduction of a trans-4-substituted cyclohexyl group into a dye molecule greatly contributes to the improvement of the S value and the stability.

For example, the S value of a pleochroic dye having a 4-substituted cyclohexyl group greatly depends on mixing ratios of the trans isomer and the cis isomer as shown in Table 1:

TABLE 1

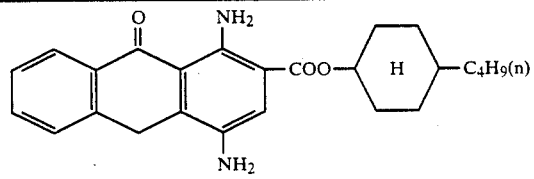

| Trans isomer:Cis isomer (Ratio of peak areas according to liquid chromatography) | S |
|---|---|
| 0.5:99.5 | 0.58 |
| 52:48 | 0.69 |
| 72:28 | 0.72 |
| 99.5:0.5 | 0.77 |

As is clear from Table 1, the S value increases remarkably when the proportion of the trans isomer increases. In order to obtain the same S value as obtained by the introduction of a phenyl group, it is preferable to use the trans isomer in an amount of about 70% or more. Needless to say, the effect of the proportion of the trans isomer becomes greater near to 100% by mole.

Preferable examples of the pleochroic dyes having trans-4-substituted cyclohexyl groups are anthraquinone dyes, azo dyes, azomethine dyes, quinophthalone dyes, perynone dyes, thioindigo dyes, naphthalimide dyes, and oxazine dyes.

These dyes can be represented by the formula:

$$D{+}B/W \quad (I)$$

wherein W is a trans-4-substituted cyclohexyl group; D is a grouping of organic dye containing no ionic group; and B is

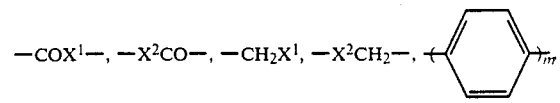

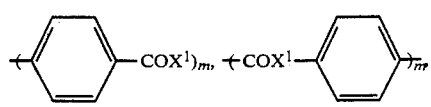
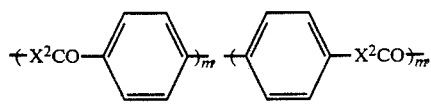
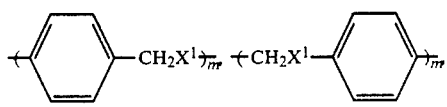
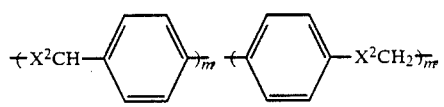
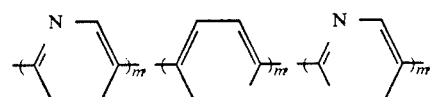
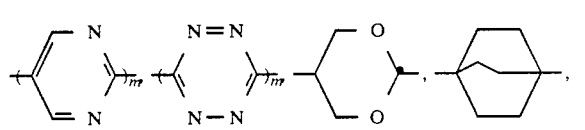
—O—, —S—, —CH$_2$—, —NH— or —OCOO—,
in which $X^1$ and $X^2$ are independently an oxygen atom, a sulfur atom, —CH$_2$— or —NR$^1$—; R$^1$ is a hydrogen atom or a lower alkyl group; m is an integer of 1, 2 or 3; and l is zero or an integer of 1.
In the above formula, typical examples of D are as follows:
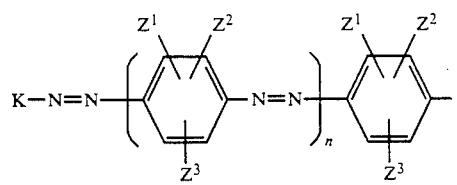  (1)
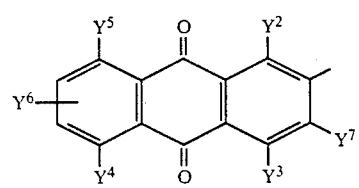  (2)
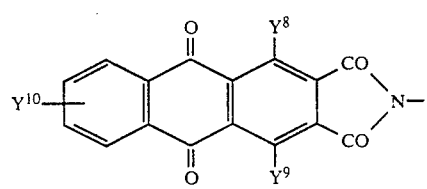  (3)
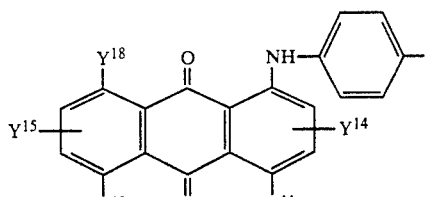  (4)
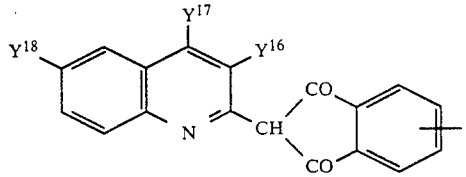  (5)
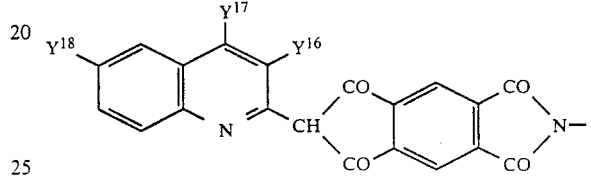  (6)
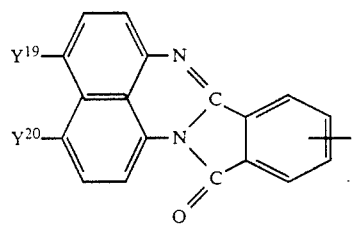  (7)
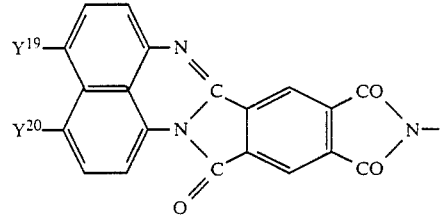  (8)
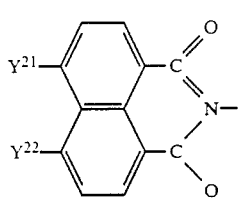  (9)
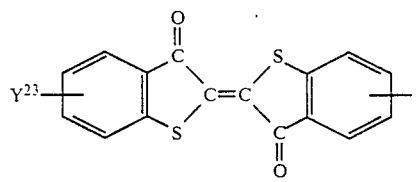  (10)
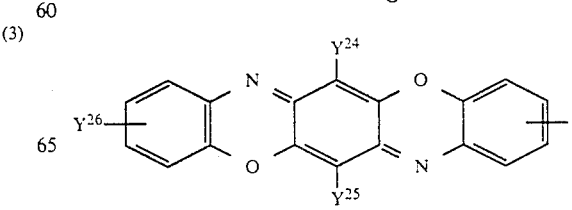  (11)

In the above formulae, each symbol has the following meaning:

K: a group of the formula:

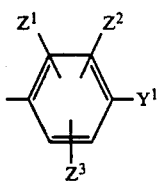

or a nitrogen-containing heterocyclic group such as azole, diazole, etc.

$Y^1$: a hydrogen atom, an alkyl group, a cycloalkyl group, an alkoxy group, a nitro group, a cyano group, a carboxylic acid ester group, an acyloxy group, an alkylsulfonyl group, an aryl group, a halogen atom, a group of the formula: $-(B)_lW$ or a group of the formula:

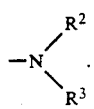

$R^2$, $R^3$: a hydrogen atom or an alkyl group. $R^2$ and $R^3$ may form a nitrogen-containing group by combining each other.

$Z^1$, $Z^2$, $Z^3$: a hydrogen atom, halogen atom, a methyl group, a hydroxyl group, a methoxy group, or a cyano group. At least one of $Z^1$ to $Z^3$ may form together with $R^2$ and $R^3$ a part of a julolidine ring. $Z^1$ and $Z^2$ may form a part of a naphthalene ring by combining each other.

n: 0, 1 or 2.

$Y^2$, $Y^3$, $Y^4$, $Y^5$: a hydrogen atom, an amino group or a hydroxyl group. At least one of $Y^2$ to $Y^5$ should be either an amino group or a hydroxyl group.

$Y^6$: a hydrogen atom, a halogen atom, an alkoxy group, or a group of the formula: $-(B)_lW$.

$Y^7$: a hydrogen atom, a halogen atom, or a cyano group.

$Y^8$, $Y^9$: an amino group or a hydroxyl group.

$Y^{10}$, $Y^{14}$, $Y^{15}$: a hydrogen atom, a halogen atom, or an alkoxy group.

$Y^{11}$, $Y^{12}$: a hydrogen atom, an amino group, or a hydroxyl group.

$Y^{13}$: a hydrogen atom, an amino group, a hydroxyl group or

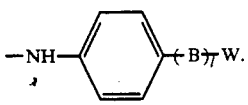

$Y^{16}$: a hydrogen atom or a hydroxyl group.

$Y^{17}$, $Y^{24}$, $Y^{25}$: a hydrogen atom or a hydroxyl group.

$Y^{18}$: a hydrogen atom, an alkyl group, an alkoxy group, or a group of the formula: $-(B)_lW$.

$Y^{19}$, $Y^{20}$: a hydrogen atom, a group of the formula:

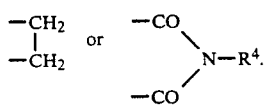

$R^4$: an alkyl group or a group of the formula: $-(B)_lW$.

$Y^{21}$, $Y^{22}$: a group of the formula:

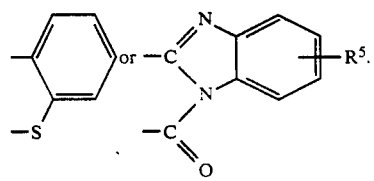

$R^5$: a hydrogen atom, a halogen atom, an alkoxy group, or a group of the formula: $-(B)_lW$.

$Y^{23}$: a hydrogen atom, an alkyl group or an alkoxy group.

$Y^{26}$: a hydrogen atom, an alkoxy group, an acyloxy group, or a group of the formula: $-(B)_lW$.

Examples of the substituent at the 4-position in the trans-4-substituted cyclohexyl group are alkyl groups such as a methyl group, an ethyl group, a normal or branched propyl group, a butyl group, a pentyl group, a hexyl group, a heptyl group, an octyl group, a nonyl group, a dodecyl group, an octadecyl group, etc.; cycloalkyl groups such as a cyclohexyl group, a trans-4-butylcyclohexyl group, a trans-4-pentylcyclohexyl group, etc.; alkoxy groups such as a methoxy group, an ethoxy group, a normal or branched propoxy group, a butoxy group, a hexyloxy group, an octyloxy group, a nonyloxy group, a dodecyloxy group, an octadecyloxy group, etc.

As the host liquid crystals usable in this invention, there can be used those which show nematic state in the operation temperature range. These host liquid crystals can be selected from a considerably wide range. Further, these nematic liquid crystals can take a cholesteric state by the addition of one or more optically active substances mentioned below. Examples of the nematic liquid crystals are those shown in Table 2 or their derivatives.

TABLE 2

| No. | Kind | Example |
|---|---|---|
| 1 | Cyclohexylcyclohexane series | 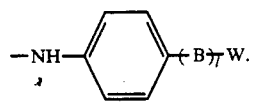 |

TABLE 2-continued

| No. | Kind | Example |
|---|---|---|
| 2 | Phenylcyclohexane series | R'—[H]—[Ph]—X |
| 3 | Biphenyl series | R'—[Ph]—[Ph]—X |
| 4 | Terphenyl series | R'—[Ph]—[Ph]—[Ph]—X |
| 5 | Cyclohexylcyclohexanoate series | R'—[H]—COO—[H]—X |
| 6 | Phenylcyclohexylcarboxylate series | R'—[H]—COO—[Ph]—X |
| 7 | Ester series | R'—[Ph]—COO—[Ph]—X |
| 8 | Diester series | R'—[Ph]—COO—[Ph]—COO—[Ph]—X<br>X—[Ph]—COO—[Ph]—COO—[Ph]—R' |
| 9 | Cyclohexylbiphenyl series | R'—[H]—[Ph]—[Ph]—X |
| 10 | Biphenylcyclohexylcarboxylate series | R'—[H]—COO—[Ph]—[Ph]—X |
| 11 | Biphenyl ester series | R'—[Ph]—[Ph]—COO—[Ph]—X<br>X—[Ph]—[Ph]—COO—[Ph]—R' |
| 12 | Thioester series | R'—[Ph]—COS—[Ph]—X |

TABLE 2-continued

| No. | Kind | Example |
|---|---|---|
| 13 | Schiff base series | 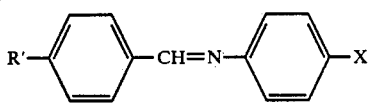 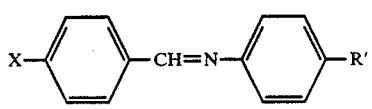 |
| 14 | Pyrimidine series | 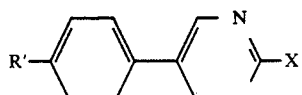 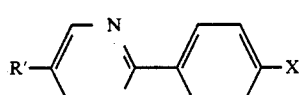 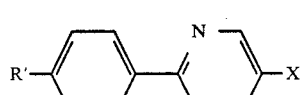 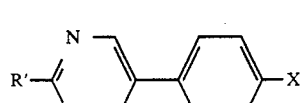 |
| 15 | Dioxane series | 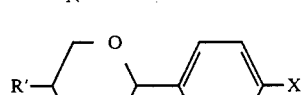 |
| 16 | Cyclohexylmethyl ether series | 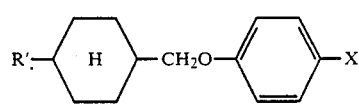 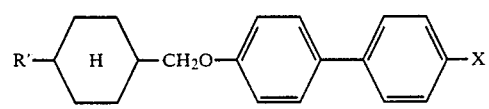 |
| 17 | Cynnamoyl nitrile series | 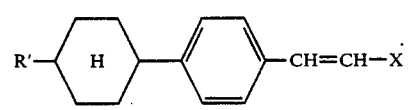 |

In the above Table 2, R' is an alkyl group or an alkoxy group; and X is a nitro group, a cyano group, or a halogen atom.

All the liquid crystals in Table 2 have positive dielectric anisotropy. But there can also be used conventional liquid crystals having negative dielectric anisotropy such as ester series, azoxy series, azo series, Schiff base series, pyrimidine series, diester series, and biphenyl ester series by mixed with those having positive dielectric anisotropy to give a mixture having positive dielectric anisotropy as a whole. Needless to say, even liquid crystals having negative dielectric anisotropy can be used as they are if a suitable device constitution and a driving method are used.

As the host liquid crystals, those listed in Table 2 or their derivatives can be used in this invention alone or as a mixture thereof. Among them, particularly preferable liquid crystal mixtures are one marketed by Merck Co., Ltd., under a trade name of ZLI-1132:

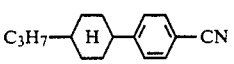 38.4% by weight

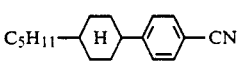 34.2% by weight

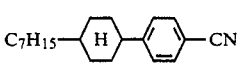 18.1% by weight

-continued

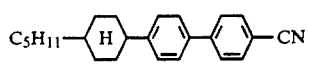 9.3% by weight (the composition being obtained by gas chromatographic analysis), and one marketed by British Drug House Co., Ltd., under a trade name of E-7:

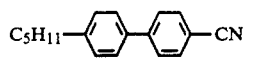 51% by weight

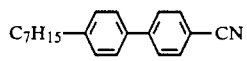 25% by weight

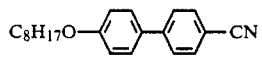 16% by weight

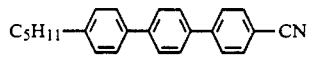 8% by weight

As the optically active substances, there can be used chiral nematic compounds such as those obtained by introducing an optically active group such as 2-methylbutyl, 3-methylbutoxy, 3-methylpentyl, 3-methylpentoxy, 4-methylhexyl, 4-methylhexytoxy, or the like into nematic liquid crystal compounds. There may also be used alcohol derivatives such as l-menthol, d-borneol, and the like; ketone derivatives such as d-camphor, 3-methylcyclohexane, and the like; carboxylic acid derivatives such as d-citronellic acid, l-camphoric acid, and the like; aldehyde derivatives such as d-citronellal and the like; alkene derivatives such as d-linonene and the like; and other amines, amides, nitrile derivatives, etc., which are disclosed in Japanese Patent Appln Kokai (Laid-Open) No. 45546/76.

The liquid crystal composition of this invention can be used in any conventional liquid crystal display devices. Such devices usually have a structure wherein a pair of glass substrates at least one of which is transparent are placed in parallel via a spacer and transparent electrodes having desired patterns are formed on the glass substrates facing each other. In such a case, the gap between the glass substrates is determined by the spacer. The gap is usually 3 to 100 μm, and particularly preferably 5 to 50 μm from the viewpoint of practical use.

This invention is illustrated by way of the following Examples.

EXAMPLE 1

Each S value of each liquid crystal composition containing a pleochroic dye having a trans-4-substituted cyclohexyl group is listed in Table 3.

As the host liquid crystals, there was used ZLI-1132. The content of the trans isomer in each pleochroic dye was 99.5% by mole or more. Dissolution of the dye was conducted by heating the mixture of the host liquid crystals and the dye at 70° C. or higher, stirring the mixture well when the mixture became an isotropic liquid, followed by cooling while allowed to stand, and repeating these steps again.

Each liquid crystal composition thus prepared was introduced in a liquid crystal display device as shown in FIG. 1. In FIG. 1, numeral 3 is a substrate made from glass, said substrate having transparent electrode 1 on the surface to be in contact with the liquid crystals. The transparent electrode 1 is covered with a polyamide resin film, which is an orientation controlling film 2 obtained by subjecting to a homogeneous orientation treatment by rubbing after curing of the resin closed. The periphery of each substrate is surrounded by a sealant 5 so as to make the gap between the substrates 10 to 100 μm. In FIG. 1, black egg-like marks in a liquid crystal layer 4 are pleochroic dye molecules 6. When no voltage is applied, each liquid crystal composition takes the homogeneous orientation state wherein liquid crystal molecules 7 and the dye molecules 6 are aligned parallel to the electrode surfaces and along one certain direction, and the dye molecules 6 also take the same orientation according to the host liquid crystals 7.

Absorption spectra of the thus prepared guest-host display devices were measured by using a light polarized in parallel to the orientation direction of the host liquid crystal molecules and a light polarized perpendicularly to obtain absorbances of $A_\parallel$ (parallel) and $A_\perp$ (perpendicular) of the dye molecules to each polarized light and the maximum absorption wavelength ($\lambda_m$). On obtaining the absorbances of the dyes, suitable corrections were made as to absorptions of the host liquid crystals and glass substrates as well as reflection loss of the display devices. Using the thus obtained absorbances $A_\parallel$ and $A_\perp$ of the dyes to each polarized light, the order parameter S were calculated from the following equation:

$$S = \frac{A_\parallel - A_\perp}{2A_\perp + A_\parallel}$$

TABLE 3

| No. | Pleochroic dye | Color | S |
|---|---|---|---|
| 1 | H3C\N-⟨phenyl⟩-N=N-⟨phenyl⟩-OCO-⟨H⟩-C4H9(n), H3C/ | Yellow | 0.70 |
| 2 | H3C\N-⟨phenyl⟩-N=N-⟨phenyl⟩-OCH2-⟨H⟩-C4H9(n), H3C/ | Yellow | 0.69 |
| 3 | (n)H9C4-⟨H⟩-⟨phenyl⟩-N=N-⟨phenyl⟩-NH2 | Yellow | 0.70 |
| 4 | (n)H9C4-⟨H⟩-⟨phenyl⟩-N=N-⟨phenyl⟩-N(C2H5)2 | Yellow | 0.70 |
| 5 | (n)H9C4-⟨H⟩-⟨phenyl⟩-N=N-⟨phenyl⟩-N(pyrrolidine) | Yellow | 0.69 |
| 6 | (n)H9C4-⟨H⟩-⟨phenyl⟩-N=N-⟨phenyl⟩-N(morpholine) | Yellow | 0.68 |
| 7 | (n)H9C4-⟨H⟩-⟨phenyl⟩-N=N-⟨julolidine⟩ | Yellow | 0.62 |

TABLE 3-continued

| # | Structure | Color | Value |
|---|---|---|---|
| 8 | (n)H₉C₄—[cyclohexane-H]—[phenyl]—N=N—[phenyl-3-CH₃]—N(CH₃)₂ | Yellow | 0.60 |
| 9 | (n)H₉C₄—[cyclohexane-H]—[phenyl]—N=N—[phenyl-3-OH]—N(CH₃)₂ | Yellow | 0.59 |
| 10 | (n)H₉C₄—[cyclohexane-H]—[phenyl]—N=N—[phenyl-3-Cl]—N(CH₃)₂ | Yellow | 0.58 |
| 11 | (n)H₉C₄—[cyclohexane-H]—[phenyl]—N=N—[phenyl-3-OCH₃]—N(CH₃)₂ | Yellow | 0.59 |
| 12 | (n)H₉C₄—[cyclohexane-H]—[phenyl]—N=N—[naphthyl]—N(CH₃)₂ | Orange | 0.57 |
| 13 | (n)H₉C₄—[cyclohexane-H]—[phenyl]—N=N—[naphthyl]—OCO—[phenyl]—C₄H₉(n) | Yellow | 0.67 |

TABLE 3-continued

| | Structure | Color | Value |
|---|---|---|---|
| 14 | (n)H₉C₄–[Cy]–[Ph]–N=N–[naphthalene-OCH₂]–[Ph]–C₄H₉(n) | Yellow | 0.66 |
| 15 | (n)H₉C₄–[Cy]–[Ph]–N=N–[naphthalene-OCO]–[Cy]–OC₄H₉(n) | Yellow | 0.70 |
| 16 | (n)H₉C₄–[Cy]–[Ph]–N=N–[naphthalene-OCH₂]–[Cy]–C₄H₉(n) | Yellow | 0.69 |
| 17 | (n)H₉C₄–[Cy]–[Ph]–N=N–[Ph]–NHCO–[Cy]–C₄H₉(n) | Yellow | 0.70 |
| 18 | (n)H₉C₄–[Cy]–[Ph]–N=N–[Ph]–N(CO-CH₃)–[Cy]–C₄H₉(n) | Yellow | 0.67 |
| 19 | (n)H₉C₄–[Cy]–[Ph]–N=N–[Ph]–NHCH₂–[Cy]–C₄H₉(n) | Yellow | 0.69 |
| 20 | (n)H₉C₄–[Cy]–[Ph]–OCO–[Ph]–N=N–[Ph]–NH₂ | Yellow | 0.69 |

TABLE 3-continued

| No. | Structure | Color | Value |
|---|---|---|---|
| 21 | (n)H₉C₄—(cyclohexyl)—OCO—(C₆H₄)—N=N—(C₆H₄)—N(C₂H₅)₂ | Yellowish orange | 0.71 |
| 22 | (n)H₉C₄—(cyclohexyl)—OCO—(C₆H₄)—N=N—(C₆H₄)—N(pyrrolidinyl) | Yellowish orange | 0.72 |
| 23 | (n)H₉C₄—(cyclohexyl)—OCO—(C₆H₄)—N=N—(C₆H₄)—N(morpholinyl) | Yellow | 0.70 |
| 24 | (n)H₉C₄—(cyclohexyl)—OCO—(C₆H₄)—N=N—(julolidinyl) | Yellowish orange | 0.66 |
| 25 | (n)H₉C₄—(cyclohexyl)—OCO—(C₆H₄)—N=N—(3-CH₃-C₆H₃)—N(CH₃)₂ | Yellowish orange | 0.68 |
| 26 | (n)H₉C₄—(cyclohexyl)—OCO—(C₆H₄)—N=N—(3-OH-C₆H₃)—N(CH₃)₂ | Yellowish orange | 0.68 |
| 27 | (n)H₉C₄—(cyclohexyl)—OCO—(C₆H₄)—N=N—(3-Cl-C₆H₃)—N(CH₃)₂ | Yellow | 0.67 |

TABLE 3-continued

| No. | Structure | Color | Value |
|---|---|---|---|
| 28 | (n)H₉C₄–[cyclohexane]–OCO–[phenyl]–N=N–[phenyl(OCH₃)]–N(CH₃)₂ | Yellowish orange | 0.66 |
| 29 | (n)H₉C₄–[cyclohexane]–OCO–[phenyl]–N=N–[naphthyl]–N(CH₃)₂ | Yellowish orange | 0.70 |
| 30 | (n)H₉C₄–[cyclohexane]–OCO–[phenyl]–N=N–[naphthyl]–OCH₂–[phenyl]–C₄H₉(n) | Yellow | 0.71 |
| 31 | (n)H₉C₄–[cyclohexane]–OCO–[phenyl]–N=N–[naphthyl]–NHCO–[phenyl]–C₄H₉(n) | Orange | 0.72 |
| 32 | (n)H₉C₄–[cyclohexane]–OCO–[phenyl]–N=N–[naphthyl]–N(CH₃)CO–[cyclohexane]–C₄H₉(n) | Yellowish orange | 0.68 |

TABLE 3-continued

| | Structure | Color | Value |
|---|---|---|---|
| 33 | (n)H$_9$C$_4$–[cyclohexyl]–OCO–C$_6$H$_4$–N=N–[naphthyl]–NHCH$_2$–C$_6$H$_4$–C$_4$H$_9$(n) | Orange | 0.69 |
| 34 | (n)H$_9$C$_4$–[cyclohexyl]–C$_6$H$_4$–N=N–[naphthyl]–N=N–C$_6$H$_4$–OCH$_2$–[cyclohexyl]–C$_4$H$_9$(n) | Yellow | 0.76 |
| 35 | (n)H$_9$C$_4$–[cyclohexyl]–COO–C$_6$H$_4$–N=N–[naphthyl]–N=N–C$_6$H$_4$–COO–C$_6$H$_4$–C$_4$H$_9$(n) | Yellow | 0.77 |
| 36 | (n)H$_9$C$_4$–[cyclohexyl]–CH$_2$O–C$_6$H$_4$–N=N–[naphthyl]–N=N–C$_6$H$_4$–COO–C$_6$H$_4$–C$_4$H$_9$(n) | Yellow | 0.76 |
| 37 | (n)H$_9$C$_4$–[cyclohexyl]–CONH–C$_6$H$_4$–N=N–[naphthyl]–N=N–C$_6$H$_4$–COO–C$_6$H$_4$–C$_4$H$_9$(n) | Yellow | 0.77 |

TABLE 3-continued

| No. | Structure | Color | Value |
|---|---|---|---|
| 38 | (n)H₉C₄—[Cy(H)]—CON(CH₃)—C₆H₄—N=N—[naphthalene]—N=N—C₆H₄—COO—C₆H₄—C₄H₉(n) | Yellow | 0.73 |
| 39 | (n)H₉C₄—[Cy(H)]—CH₂NH—C₆H₄—N=N—[naphthalene]—N=N—C₆H₄—COO—C₆H₄—C₄H₉(n) | Yellow | 0.76 |
| 40 | (n)H₉C₄—[Cy(H)]—OCO—C₆H₄—N=N—C₆H₄—N=N—[naphthalene]—OCH₂—C₆H₄—C₄H₉(n) | Yellow | 0.78 |
| 41 | (n)H₉C₄—[Cy(H)]—C₆H₄—N=N—[naphthalene]—N=N—C₆H₄—OCO—[Cy(H)]—OC₅H₁₁(n) | Yellow | 0.78 |
| 42 | (n)H₉C₄—[Cy(H)]—C₆H₄—OCO—C₆H₄—N=N—[naphthalene]—N=N—C₆H₄—[Cy(H)]—C₅H₁₁(n) | Yellow | 0.78 |

TABLE 3-continued

| No. | Structure | Color | Value |
|---|---|---|---|
| 43 | (n)H₁₁C₅–[H]–[phenyl]–N=N–[naphthyl]–N=N–[phenyl]–NHCO–[phenyl]–[H]–C₅H₁₁(n) | Yellowish orange | 0.78 |
| 44 | (n)H₉C₄–[H]–[phenyl]–N=N–[naphthyl]–N=N–[phenyl]–N(CH₃)CO–[phenyl]–[H]–C₄H₉(n) | Orange | 0.76 |
| 45 | (n)H₉C₄–[H]–COO–[phenyl]–N=N–[naphthyl]–N=N–[phenyl]–N(CH₃)₂ | Red | 0.77 |
| 46 | (n)H₁₁C₅–[H]–OCO–[phenyl]–N=N–[naphthyl]–N=N–[phenyl]–N(CH₃)₂ | Reddish violet | 0.76 |
| 47 | (n)H₁₁C₅–[H]–SCO–[phenyl]–N=N–[naphthyl]–N=N–[phenyl]–N(CH₃)₂ | Reddish violet | 0.75 |

TABLE 3-continued

| No. | Structure | Color | Value |
|---|---|---|---|
| 48 | (n)H₁₁C₅–[cyclohexane(H)]–COCH₂–C₆H₄–N=N–[naphthalene]–N=N–C₆H₄–N(CH₃)₂ | Red | 0.76 |
| 49 | (n)H₁₁C₅–[cyclohexane(H)]–CH₂CO–C₆H₄–N=N–[naphthalene]–N=N–C₆H₄–N(CH₃)₂ | Reddish violet | 0.75 |
| 50 | (n)H₁₁C₅–[cyclohexane(H)]–CONH–C₆H₄–N=N–[naphthalene]–N=N–C₆H₄–N(CH₃)₂ | Red | 0.76 |
| 51 | (n)H₉C₄–[cyclohexane(H)]–NHCO–C₆H₄–N=N–[naphthalene]–N=N–C₆H₄–N(CH₃)₂ | Red | 0.76 |
| 52 | (n)H₉C₄–[cyclohexane(H)]–CON(CH₃)–C₆H₄–N=N–[naphthalene]–N=N–C₆H₄–N(CH₃)₂ | Red | 0.73 |

TABLE 3-continued

| No. | Structure | Color | Value |
|---|---|---|---|
| 53 | (n)H₉C₄–[cyclohexyl-H]–N(CO)(CH₃)–C₆H₄–N=N–[naphthalene]–N=N–C₆H₄–OC₄H₉(n) | Yellow | 0.71 |
| 54 | (n)H₉C₄–[cyclohexyl-H]–OCH₂–C₆H₄–N=N–[naphthalene]–N=N–C₆H₄–OC₄H₉(n) | Yellow | 0.73 |
| 55 | (n)H₉C₄–[cyclohexyl-H]–CH₂O–C₆H₄–N=N–[naphthalene]–N=N–C₆H₄–OC₄H₉(n) | Yellow | 0.74 |
| 56 | (n)H₉C₄–[cyclohexyl-H]–SCH₂–C₆H₄–N=N–[naphthalene]–N=N–C₆H₄–OC₄H₉(n) | Yellow | 0.73 |
| 57 | (n)H₉C₄–[cyclohexyl-H]–CH₂S–C₆H₄–N=N–[naphthalene]–N=N–C₆H₄–OC₄H₉(n) | Yellow | 0.73 |

TABLE 3-continued

| No. | Structure | Color | Value |
|---|---|---|---|
| 58 | (n)H₉C₄–[cyclohexyl-H]–CH₂CH₂–C₆H₄–N=N–[naphthyl]–N=N–C₆H₄–OC₄H₉(n) | Yellow | 0.72 |
| 59 | (n)H₉C₄–[cyclohexyl-H]–NHCH₂–C₆H₄–N=N–[naphthyl]–N=N–C₆H₄–OC₄H₉(n) | Yellow | 0.73 |
| 60 | (n)H₉C₄–[cyclohexyl-H]–CH₂NH–C₆H₄–N=N–[naphthyl]–N=N–C₆H₄–N(CH₃)₂ | Reddish violet | 0.75 |
| 61 | (n)H₉C₄–[cyclohexyl-H]–C₆H₄–C₆H₄–N=N–[naphthyl]–N=N–C₆H₄–N(CH₃)₂ | Reddish violet | 0.78 |
| 62 | (n)H₉C₄–[cyclohexyl-H]–C₆H₄–COO–C₆H₄–N=N–[naphthyl]–N=N–C₆H₄–N(CH₃)₂ | Red | 0.76 |

TABLE 3-continued

| No. | Structure | Color | Value |
|---|---|---|---|
| 63 | (n)H₉C₄–[Cy]–C₆H₄–COO–C₆H₄–COO–C₆H₄–N=N–[Naph]–N=N–C₆H₄–N(CH₃)₂ | Red | 0.78 |
| 64 | (n)H₁₁C₅–[Cy]–COO–C₆H₄–C₆H₄–N=N–[Naph]–N=N–C₆H₄–N(CH₃)₂ | Reddish violet | 0.79 |
| 65 | (n)H₉C₄–[Cy]–OCO–C₆H₄–C₆H₄–N=N–[Naph]–N=N–C₆H₄–N(CH₃)₂ | Reddish violet | 0.78 |
| 66 | (n)H₁₁C₅–[Cy]–OCO–C₆H₄–C₆H₄–N=N–[Naph]–N=N–C₆H₄–N(CH₃)₂ | Reddish violet | 0.77 |
| 67 | (n)H₁₁C₅–[Cy]–COS–C₆H₄–N=N–[Naph]–N=N–C₆H₄–N(CH₃)₂ | Red | 0.78 |

TABLE 3-continued

| No. | Structure | Color | Value |
|---|---|---|---|
| 68 | (n)H₁₁C₅–[cyclohexyl-H]–CONH–C₆H₄–C₆H₄–N=N–[naphthyl]–N=N–C₆H₄–N(CH₃)₂ | Reddish violet | 0.78 |
| 69 | (n)H₁₁C₅–[cyclohexyl-H]–CON(CH₃)–C₆H₄–C₆H₄–N=N–[naphthyl]–N=N–C₆H₄–N(CH₃)₂ | Reddish violet | 0.76 |
| 70 | (n)H₉C₄–[cyclohexyl-H]–COCH₂–C₆H₄–N=N–[naphthyl]–N=N–C₆H₄–N(CH₃)₂ | Red | 0.77 |
| 71 | (n)H₉C₄–[cyclohexyl-H]–CH₂O–C₆H₄–N=N–[naphthyl]–N=N–C₆H₄–OC₃H₇(n) | Yellow | 0.76 |
| 72 | (n)H₉C₄–[cyclohexyl-H]–CH₂S–C₆H₄–C₆H₄–N=N–[naphthyl]–N=N–C₆H₄–OC₄H₉(n) | Yellow | 0.77 |

TABLE 3-continued
| | | | |
|---|---|---|---|
| 73 | 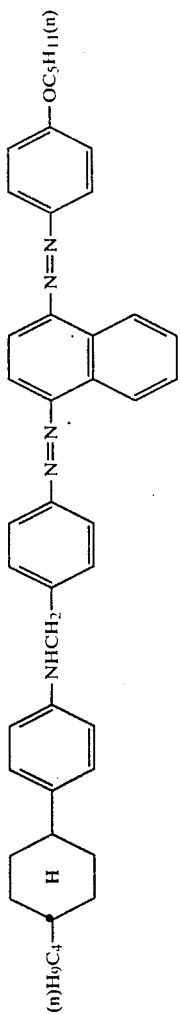 | Yellow | 0.76 |
| 74 | 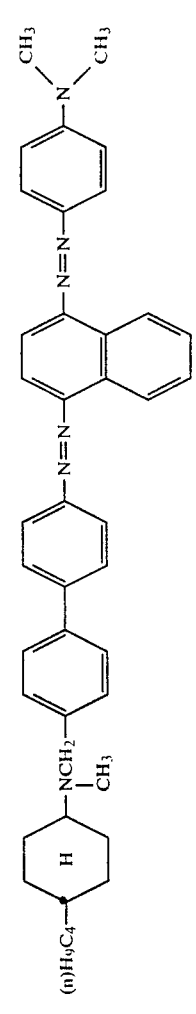 | Reddish violet | 0.77 |
| 75 | 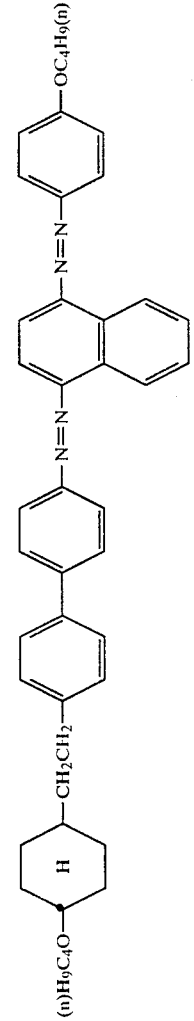 | Yellow | 0.76 |
| 76 | 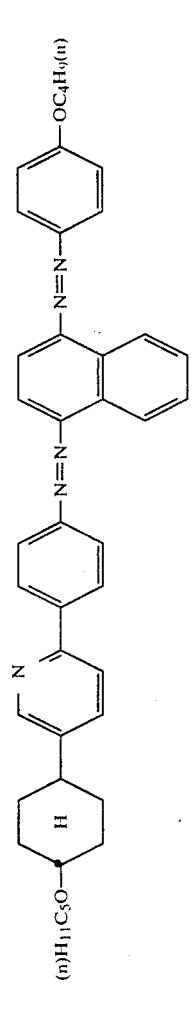 | Yellow | 0.78 |
| 77 | 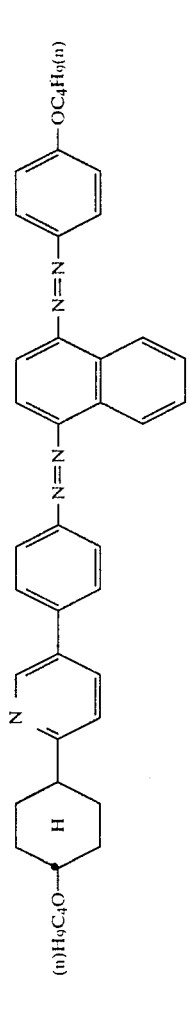 | Yellow | 0.78 |

TABLE 3-continued

| No. | Structure | Color | Value |
|---|---|---|---|
| 78 | (n)H₉C₄O–[cyclohexane]–C(=N-N=)–C₆H₄–N=N–[naphthalene]–N=N–C₆H₄–OC₄H₉(n) | Yellow | 0.79 |
| 79 | (n)H₉C₄O–[cyclohexane]–N=N–N=N–C₆H₄–N=N–[naphthalene]–N=N–C₆H₄–OC₄H₉(n) | Yellowish orange | 0.80 |
| 80 | (n)H₉C₄O–[cyclohexane]–[dioxane]–C₆H₄–N=N–[naphthalene]–N=N–C₆H₄–N(CH₃)₂ | Red | 0.79 |
| 81 | (n)H₉C₄O–[cyclohexane]–[bicyclooctane]–C₆H₄–N=N–[naphthalene]–N=N–C₆H₄–OC₄H₉(n) | Yellow | 0.78 |
| 82 | (n)H₉C₄–[cyclohexane]–O–C₆H₄–N=N–[naphthalene]–N=N–C₆H₄–N(CH₃)₂ | Red | 0.72 |

TABLE 3-continued

| No. | Structure | Color | Value |
|---|---|---|---|
| 83 | (n)H₉C₄–[cyclohexyl-H]–S–C₆H₄–N=N–[naphthyl]–N=N–C₆H₄–OC₄H₉(n) | Yellow | 0.71 |
| 84 | (n)H₉C₄–[cyclohexyl-H]–CH₂–C₆H₄–N=N–[naphthyl]–N=N–C₆H₄–N(CH₃)₂ | Red | 0.71 |
| 85 | (n)H₉C₄–[cyclohexyl-H]–NH–C₆H₄–N=N–[naphthyl]–N=N–C₆H₄–OC₄H₉(n) | Yellow | 0.71 |
| 86 | (n)H₉C₄–[cyclohexyl-H]–OOCO–C₆H₄–N=N–[naphthyl]–N=N–C₆H₄–N(CH₃)₂ | Reddish violet | 0.72 |
| 87 | (n)H₉C₄–[cyclohexyl-H]–C₆H₄–N=N–C₆H₄–C₄H₉(n) | Yellow | 0.74 |
| 88 | (n)H₁₁C₅–[cyclohexyl-H]–C₆H₄–N=N–C₆H₄–OC₄H₉(n) | Yellow | 0.74 |

TABLE 3-continued

| No. | Structure | Color | Value |
|---|---|---|---|
| 89 | (n)H₉C₄–[cyclohexane-H]–[phenyl]–N=N–[phenyl]–N=N–[phenyl]–Cl | Yellow | 0.74 |
| 90 | (n)H₉C₄–[cyclohexane-H]–[phenyl]–N=N–[phenyl]–N=N–[phenyl]–Br | Yellow | 0.75 |
| 91 | (n)H₉C₄–[cyclohexane-H]–[phenyl]–N=N–[phenyl]–COO–[cyclohexane-H]–C₄H₉(n) | Yellow | 0.77 |
| 92 | (n)H₁₁C₅–[cyclohexane-H]–[phenyl]–N=N–[phenyl]–COS–[cyclohexane-H]–OC₄H₉(n) | Yellow | 0.77 |
| 93 | (n)H₉C₄O–[cyclohexane-H]–[phenyl]–N=N–[phenyl]–CONH–[cyclohexane-H]–C₅H₁₁(n) | Yellow | 0.78 |
| 94 | (n)H₉C₄O–[cyclohexane-H]–[phenyl]–N=N–[phenyl]–COCH₂–[cyclohexane-H]–C₄H₉(n) | Yellow | 0.76 |
| 95 | (n)H₉C₄–[cyclohexane-H]–[phenyl]–N=N–[phenyl]–SCH₂–[cyclohexane-H]–C₄H₉(n) | Yellow | 0.77 |
| 96 | (n)H₉C₄–[cyclohexane-H]–[phenyl]–N=N–[phenyl]–CH₂NH–[cyclohexane-H]–C₅H₁₁(n) | Yellow | 0.77 |
| 97 | (n)H₉C₄O–[cyclohexane-H]–[phenyl]–N=N–[phenyl]–CON(CH₃)–[cyclohexane-H]–C₆H₁₃(n) | Yellow | 0.74 |

TABLE 3-continued

| | Structure | Color | Value |
|---|---|---|---|
| 98 | (n)H₉C₄–[cyclohexane-H]–[cyclohexane-H]–⟨phenyl⟩–N=N–⟨phenyl⟩–N=N–⟨phenyl⟩–OCO–⟨phenyl⟩–[cyclohexane-H]–C₄H₉(n) | Yellow | 0.80 |
| 99 | (n)H₉C₄–[cyclohexane-H]–OCO–⟨phenyl⟩–N=N–⟨phenyl⟩–N=N–⟨phenyl⟩–OCH₂–⟨phenyl⟩–[cyclohexane-H]–C₄H₉(n) | Yellow | 0.79 |
| 100 | (n)H₉C₄–[cyclohexane-H]–CH₂O–⟨phenyl⟩–N=N–⟨phenyl⟩–O–⟨phenyl⟩–[cyclohexane-H]–C₄H₉(n) | Yellow | 0.74 |
| 101 | (n)H₉C₄–[cyclohexane-H]–⟨phenyl⟩–⟨phenyl⟩–N=N–⟨phenyl⟩–N(CH₃)₂ | Yellow | 0.80 |
| 102 | (n)H₉C₄–[cyclohexane-H]–⟨phenyl⟩–COO–⟨phenyl⟩–N=N–⟨phenyl⟩–N(C₂H₅)₂ | Yellow | 0.78 |
| 103 | (n)H₉C₄O–[cyclohexane-H]–⟨phenyl⟩–COO–⟨phenyl⟩–⟨phenyl⟩–N=N–⟨phenyl⟩–N(CH₃)₂ | Yellow | 0.77 |
| 104 | (n)H₉C₄–[cyclohexane-H]–⟨phenyl⟩–OCO–⟨phenyl⟩–CH₂O–⟨phenyl⟩–N=N–⟨phenyl⟩–N(CH₃)₂ | Yellow | 0.77 |
| 105 | (n)H₉C₄–[cyclohexane-H]–⟨phenyl⟩–N=N–⟨phenyl⟩–N=N–C(CH₃)=C(–N=N–Ph)–C(OH)... pyrazole ring | Yellow | 0.68 |

TABLE 3-continued

| | Structure | Color | Value |
|---|---|---|---|
| 106 | | Yellow | 0.67 |
| 107 | | Yellow | 0.71 |
| 108 | | Red | 0.78 |
| 109 | | Orange | 0.80 |
| 110 | | Bluish violet | 0.70 |
| 111 | | Yellow | 0.70 |

| | | | |
|---|---|---|---|
| 112 | (structure) | Yellow | 0.69 |
| 113 | (structure) | Yellow | 0.69 |
| 114 | (structure) | Yellow | 0.69 |
| 115 | (structure) | Yellow | 0.72 |
| 116 | (structure) | Yellow | 0.74 |

-continued

| | | | |
|---|---|---|---|
| 117 | [structure with Br, OH, quinoline, phthalimide, cyclohexyl-C4H9(n)] | Yellow | 0.70 |
| 118 | [structure with (n)H9C4-quinoline, OH, phthalimide, dicyclohexyl-OC4H9(n)] | Yellow | 0.73 |
| 119 | [structure with (n)H9C4-quinoline, OH, phthalimide, cyclohexyl-phenyl-C4H9(n)] | Yellow | 0.74 |
| 120 | [structure with (n)H9C4-quinoline, OH, phthalimide, cyclohexyl-OC4H9(n)] | Yellow | 0.69 |
| 121 | [structure with (n)H9C4O-quinoline, OH, phthalimide, cyclohexyl-C4H9(n)] | Yellow | 0.72 |
| 122 | [structure with (n)H9C4-cyclohexyl-CH2O-phenyl, OH, phthalimide, cyclohexyl-C4H9(n)] | Yellow | 0.73 |

-continued
| | | | |
|---|---|---|---|
| 123 | 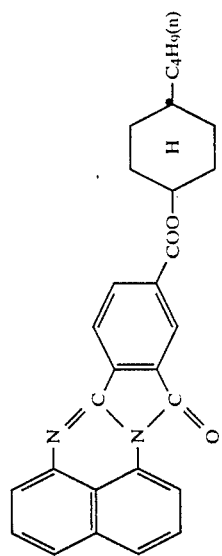 | Orange | 0.69 |
| 124 | 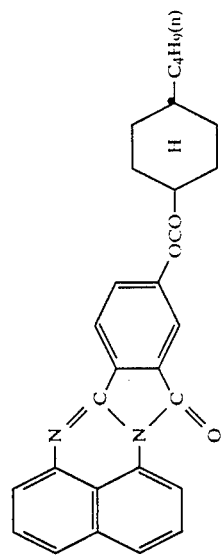 | Orange | 0.69 |
| 125 | 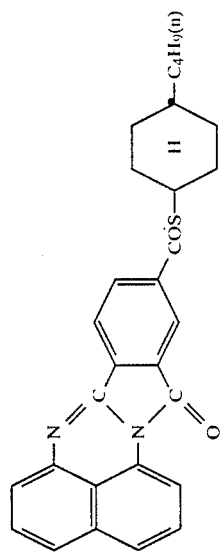 | Orange | 0.70 |
| 126 | 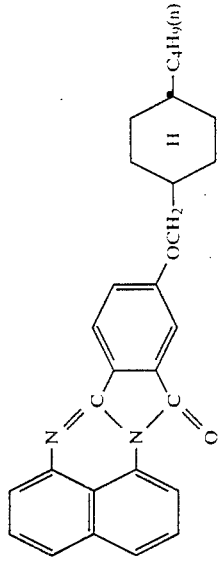 | Orange | 0.68 |

| | | |
|---|---|---|
| 127 | [structure: naphthalene-fused imide with phenyl-CONH-cyclohexyl-C4H9(n)] | Orange 0.64 |
| 128 | [structure: naphthalene-fused imide with phenyl-CON(CH3)-cyclohexyl-C4H9(n)] | Orange 0.62 |
| 129 | [structure: naphthalene-fused imide with phenyl-COO-cyclohexyl-cyclohexyl-C4H9(n)] | Orange 0.72 |
| 130 | [structure: acenaphthylene-fused imide with phenyl-COO-cyclohexyl-C4H9(n)] | Orange 0.71 |

| | | | |
|---|---|---|---|
| 131 | [structure] | Orange | 0.70 |
| 132 | [structure] | Orange | 0.73 |
| 133 | [structure] | Orange | 0.74 |
| 134 | [structure] | Orange | 0.72 |

-continued

| | | | |
|---|---|---|---|
| 135 | [structure] | Orange | 0.72 |
| 136 | [structure] | Orange | 0.70 |
| 137 | [structure] | Orange | 0.72 |
| 138 | [structure] | Orange | 0.75 |

-continued
| | | | |
|---|---|---|---|
| 139 | 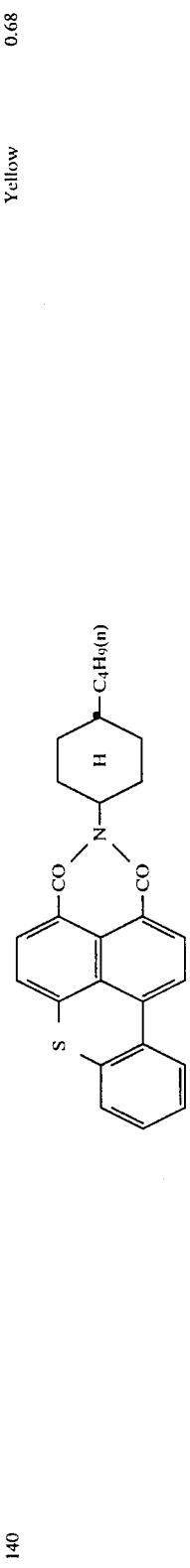 | Orange | 0.76 |
| 140 | 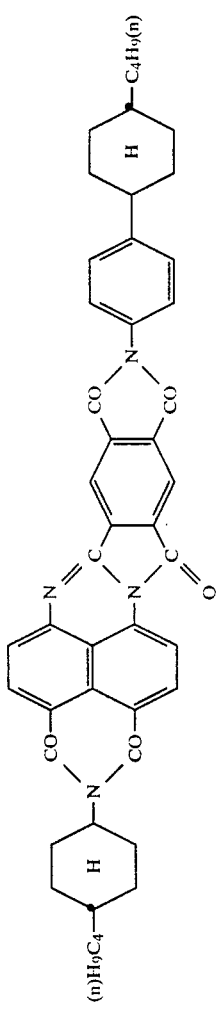 | Yellow | 0.68 |
| 141 | 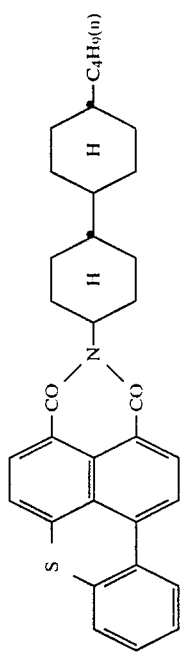 | Yellow | 0.72 |
| 142 | 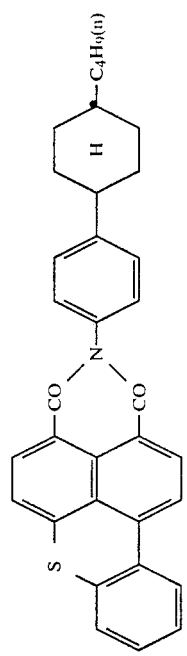 | Yellow | 0.73 |
| 143 | 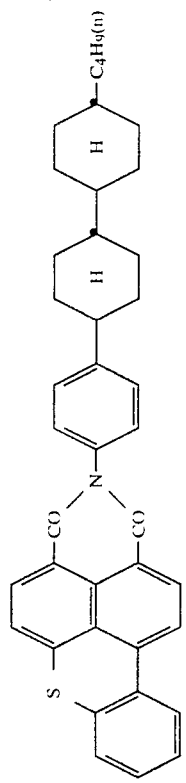 | Orange | 0.76 |

| # | Structure | Color | Value |
|---|---|---|---|
| 144 | | Yellowish orange | 0.68 |
| 145 | | Yellow | 0.70 |
| 146 | | Orange | 0.71 |
| 147 | | Red | 0.72 |
| 148 | | Reddish orange | 0.72 |

| | | | |
|---|---|---|---|
| 149 | ![structure with (n)H9C4-cyclohexyl-OCO- on phenoxazine dimer with Cl, and -OCO-cyclohexyl-C4H9(n)] | Reddish violet | 0.65 |
| 150 | ![structure with (n)H9C4-cyclohexyl-CH2O- on phenoxazine dimer with Cl, and -OCH2-cyclohexyl-C4H9(n)] | Reddish violet | 0.66 |
| 151 | ![anthraquinone with OH, OH and cyclohexyl-C4H9(n)] | Yellowish orange | 0.72 |
| 152 | ![anthraquinone with OH, NH2 and cyclohexyl-C4H9(n)] | Reddish violet | 0.73 |
| 153 | ![anthraquinone with NH2, OH and cyclohexyl-C4H9(n)] | Reddish violet | 0.72 |

| | | | |
|---|---|---|---|
| 154 | 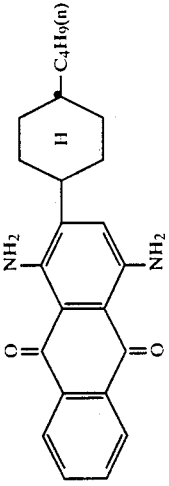 | Reddish violet | 0.74 |
| 155 | 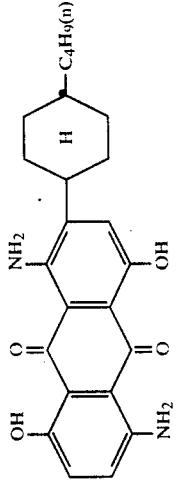 | Blue | 0.72 |
| 156 | 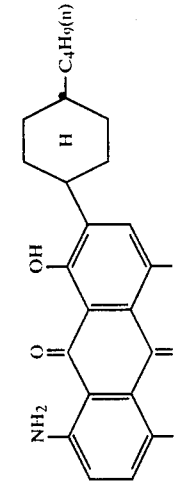 | Blue | 0.73 |
| 157 | 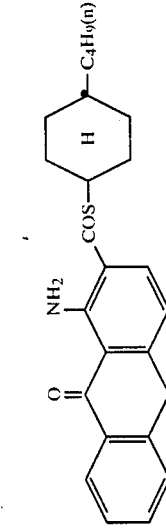 | Blue | 0.73 |
| 158 | 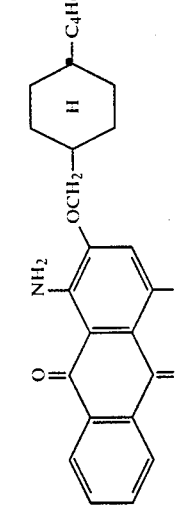 | Red | 0.70 |

| | | | |
|---|---|---|---|
| 159 | 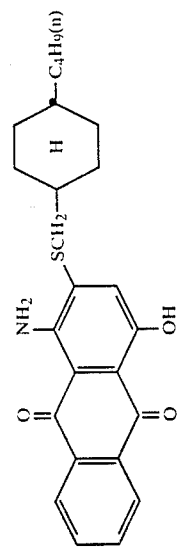 | Reddish violet | 0.74 |
| 160 | 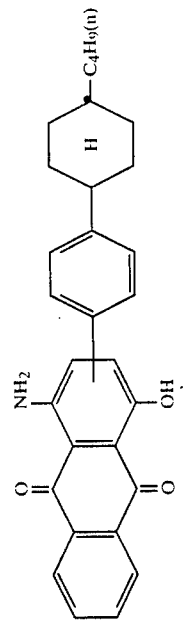 | Reddish violet | 0.73 |
| 161 | 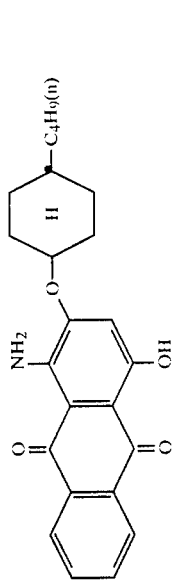 | Red | 0.70 |
| 162 | 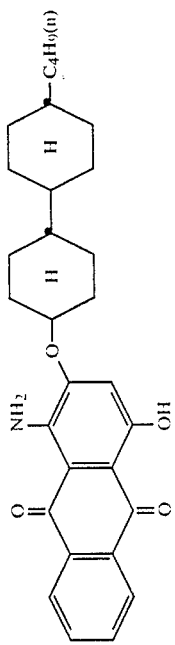 | Red | 0.72 |
| 163 | 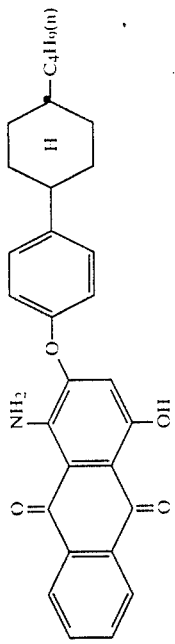 | Red | 0.71 |

| # | Structure | Color | Value |
|---|---|---|---|
| 164 | 1-NH₂, 2-S-(4-n-C₄H₉-cyclohexyl), 4-OH anthraquinone | Reddish violet | 0.60 |
| 165 | 1-NH₂, 2-OCO-O-(4-n-C₄H₉-cyclohexyl), 4-OH anthraquinone | Bluish violet | 0.62 |
| 166 | 1-NH₂, 2-NH-(4-n-C₄H₉-cyclohexyl), 4-OH anthraquinone | Red | 0.61 |
| 167 | 1,4-NH₂, 2-CH₂O-(cyclohexyl)-CH₂O-(4-n-C₄H₉-cyclohexyl) anthraquinone | Violet | 0.77 |
| 168 | 1,5-NH₂, 4,8-OH, 2-CH₂CH₂-(cyclohexyl)-CH₂CH₂-(4-n-OC₄H₉-cyclohexyl) anthraquinone | Blue | 0.77 |

| | -continued | | |
|---|---|---|---|
| 169 | 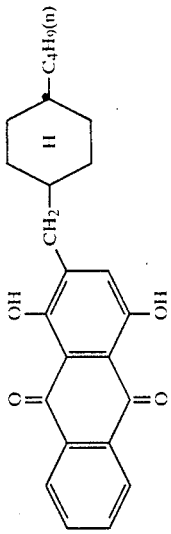 | Yellowish orange | 0.66 |
| 170 | 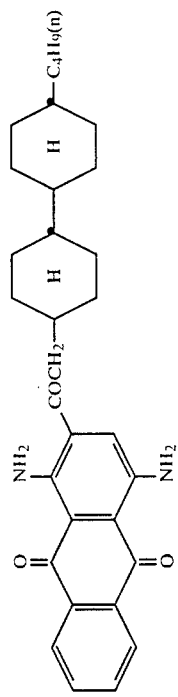 | Blue | 0.72 |
| 171 | 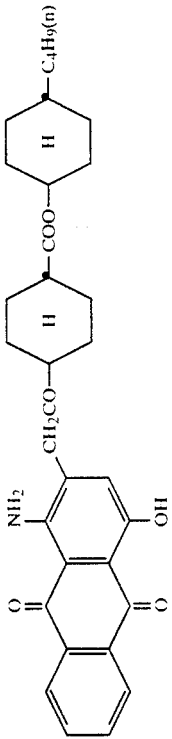 | Reddish violet | 0.76 |
| 172 | 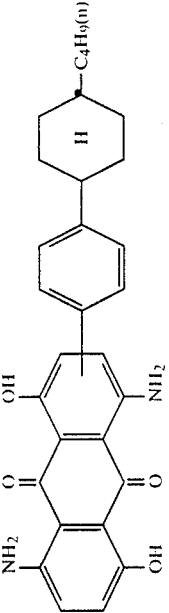 | Blue | 0.75 |
| 173 | 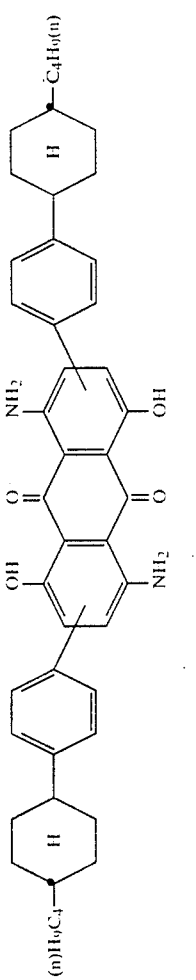 | Blue | 0.79 |

-continued
| | | | |
|---|---|---|---|
| 174 | 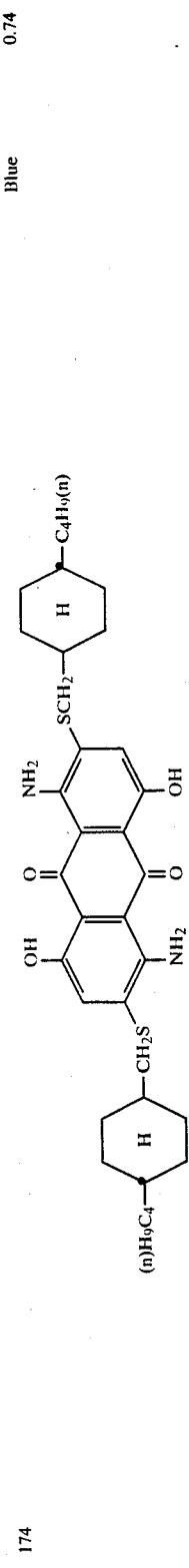 | Blue | 0.74 |
| 175 | 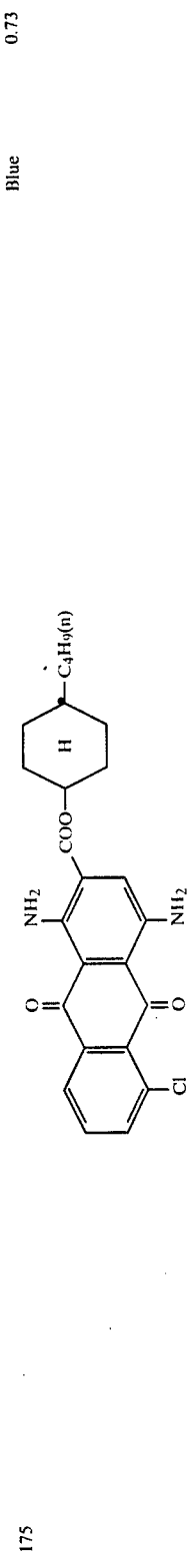 | Blue | 0.73 |
| 176 | 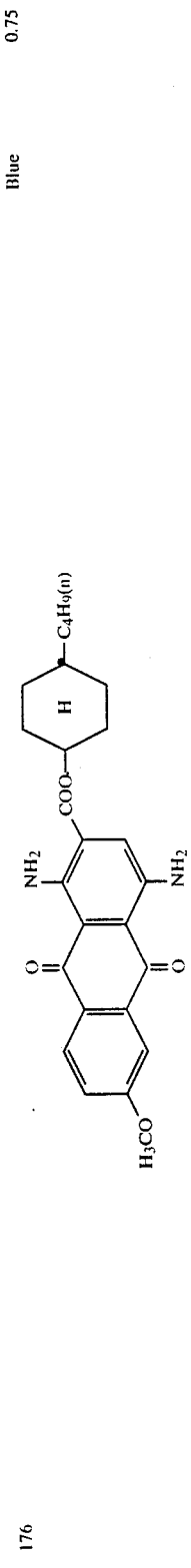 | Blue | 0.75 |
| 177 | 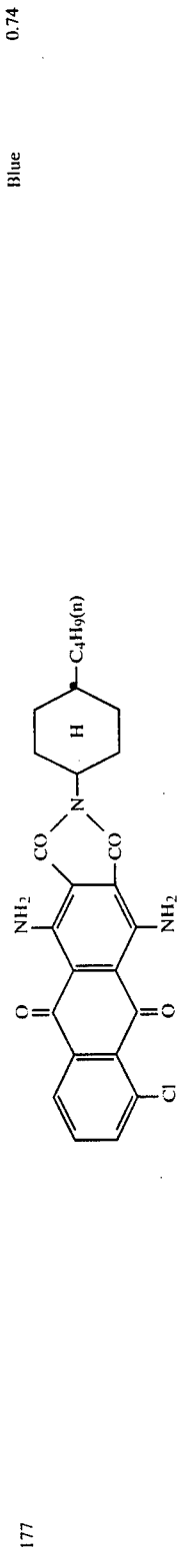 | Blue | 0.74 |
| 178 | 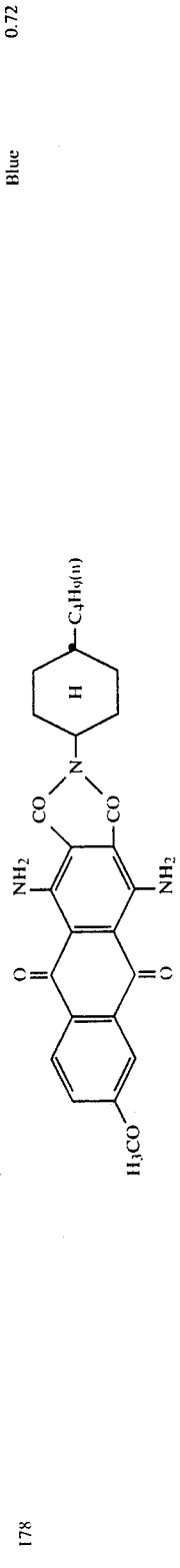 | Blue | 0.72 |

-continued
| | | | |
|---|---|---|---|
| 179 | 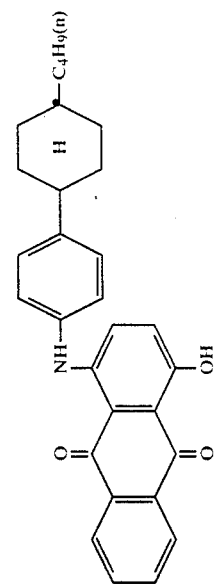 | Blue | 0.70 |
| 180 | 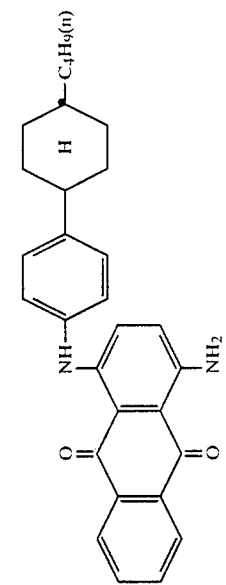 | Blue | 0.71 |
| 181 | 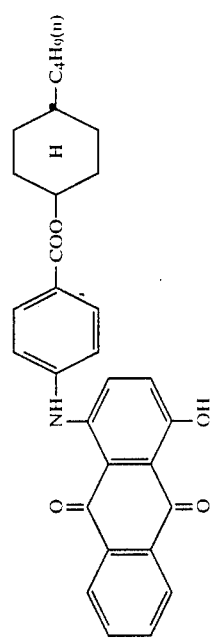 | Blue | 0.69 |
| 182 | 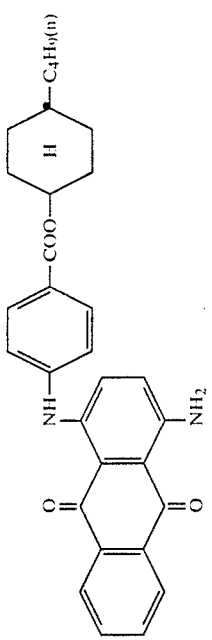 | Blue | 0.70 |

-continued

| No. | Structure | Color | Value |
|---|---|---|---|
| 183 | 1-(4-(trans-4-n-butylcyclohexylcarbonyloxy)phenylamino)-4-hydroxyanthraquinone | Bluish violet | 0.69 |
| 184 | 1-(4-(trans-4-n-butylcyclohexylmethoxy)phenylamino)-4-hydroxyanthraquinone | Blue | 0.68 |
| 185 | 1-(4-(trans-4-n-butylcyclohexylmethylthio)phenylamino)-4-aminoanthraquinone | Blue | 0.67 |
| 186 | 1-(4-(trans-4-n-butylcyclohexylmethyleneoxy)phenylamino)-4-hydroxyanthraquinone | Blue | 0.67 |

-continued
| | | | |
|---|---|---|---|
| 187 | 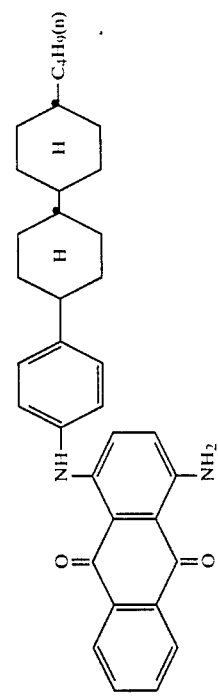 | Blue | 0.72 |
| 188 | 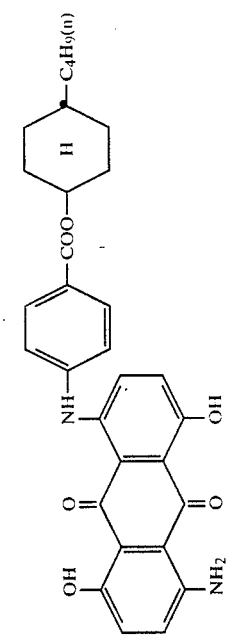 | Blue | 0.70 |
| 189 | 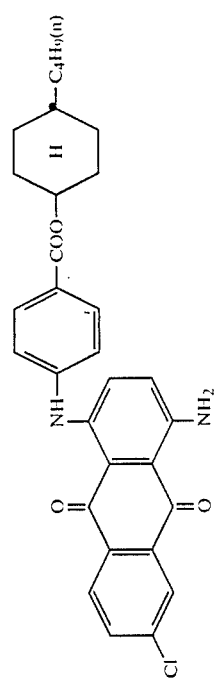 | Blue | 0.71 |
| 190 | 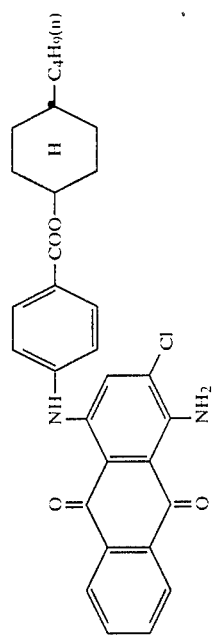 | Blue | 0.70 |

-continued

| | | | |
|---|---|---|---|
| 191 | [anthraquinone structure with NH-phenyl-cyclohexyl-C4H9(n) on both sides] | Violet | 0.74 |
| 192 | [anthraquinone structure with NH-phenyl-cyclohexyl-cyclohexyl-C4H9(n) top and NH-phenyl-cyclohexyl-cyclohexyl-C5H11(n) bottom] | Violet | 0.76 |
| 193 | [anthraquinone structure with NH-phenyl-cyclohexyl-cyclohexyl-C4H9(n) on both sides] | Violet | 0.76 |
| 194 | [anthraquinone structure with NH-phenyl-OOC-cyclohexyl-C4H9(n) on both sides] | Reddish violet | 0.73 |

-continued
| | | | | |
|---|---|---|---|---|
| 195 | 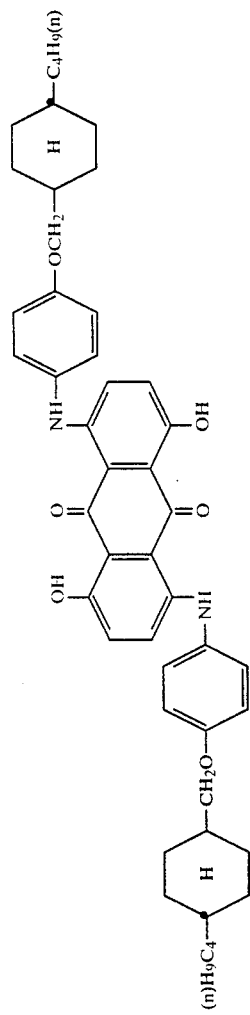 | Blue | 0.72 |
| 196 | 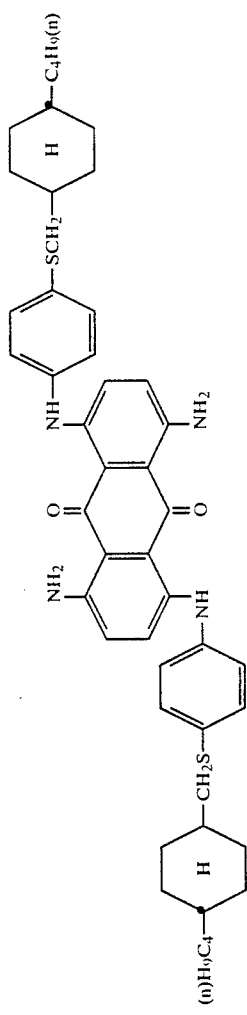 | Blue | 0.72 |
| 197 | 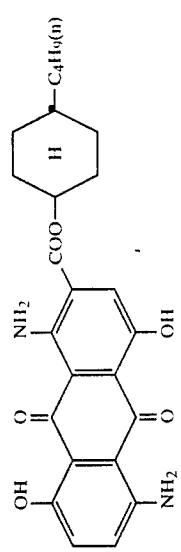 | Blue | 0.75 |
| 198 | 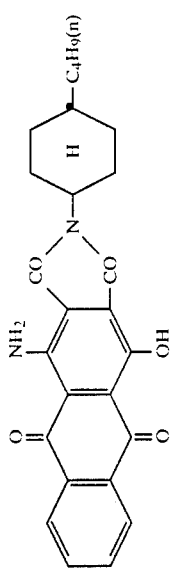 | Violet | 0.73 |
| 199 | 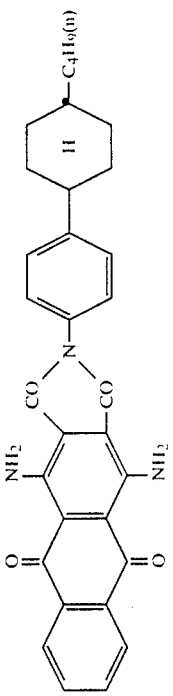 | Blue | 0.76 |

EXAMPLE 2

As the pleochroic dye, anthraquinone series dyes represented by the formula:

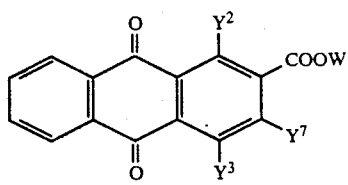

wherein $Y^2$, $Y^3$, $Y^7$ and W are as listed in Table 4, were used. These dyes were produced directly from a trans-4-substituted cyclohexanol and anthraquinone-2-carboxylic acid or from a trans-4-substituted cyclohexanol ester of anthraquinone-2-carboxylic acid by methods, for example, as disclosed in Japanese Patent Appln Kokai (Laid-Open) No. 78731/79. The trans-4-substituted cyclohexanols were produced, for example, by a method disclosed in Japanese Patent Appln Kokai (Laid-Open) No. 57539/80.

An example for producing a pleochroic anthraquinone dye used in this Example was shown in the following Synthesis Example 1 and the maximum absorption wavelength ($\lambda_{max}$) and the order parameter (S) obtained in the same manner as described in Example 1 were shown in Table 4.

SYNTHESIS EXAMPLE 1

(Synthesis of the dye No. 200 in Table 4)

1-Amino-4-nitroanthraquinone-2-carboxylic acid in an amount of 62.4 g, 47.6 g of thionyl chloride and 1 ml of N,N-dimethylformamide were heated in 300 ml of dioxane at 80° C. for 5 hours. After cooling, the reaction mixture was diluted with 500 ml of n-hexane, filtered and dried to give the corresponding carboxylic acid chloride in an amount of 63.1 g.

Then, 13.2 g of the acid chloride mentioned above and 7.5 g of trans-4-(n-butyl)cyclohexanol were heated in 200 ml of o-dichlorobenzene at 140° C. for 1 hour. After cooling to 50° C. and neutralizing with 4 g of triethylamine, 400 ml of aqueous solution of ammonium sulfide was added dropwise at 80° C. to conduct the reaction for 4 hours.

After cooling, the reaction mixture was extracted with chloroform and purified by column chromatography to give 10.1 g of the dye No. 200 in Table 4 having a melting point of 147°–148° C.

SYNTHESIS EXAMPLE 2

(Synthesis of the dye No. 218 in Table 4)

In 160 ml of N,N-dimethylformamide, 10 g of the dye No. 200 in Table 4 and 3.7 g of sodium dihydrogen phosphate were dissolved and 2.3 g of sodium cyanide was added thereto little by little, while heated at 60°–65° C. for 2 hours. Then, 10 g of sodium m-nitrobenzenesulfonate dissolved in 400 ml of water was added thereto and heated at 80° C. for 1 hour.

After cooling, filtration, water washing and drying, the reaction product was purified by column chromatography to give 7.5 g of the dye No. 218 in Table 4 having a melting point of 179°–180° C.

In the same manner as mentioned above, the dyes Nos. 201 to 217 and 219 to 225 shown in Table 4 were synthesized.

TABLE 4

| No. | $Y^2$ | $Y^3$ | $Y^7$ | W | $\lambda_{max}$ (nm) | S |
|---|---|---|---|---|---|---|
| 200 | $NH_2$ | $NH_2$ | H | —⟨H⟩—$C_4H_9$(n) | 638 | 0.77 |
| 201 | $NH_2$ | H | H | —⟨H⟩—$C_4H_9$(n) | 483 | 0.76 |
| 202 | $NH_2$ | OH | H | —⟨H⟩—$C_4H_9$(n) | 568 | 0.72 |
| 203 | $NH_2$ | OH | H | —⟨H⟩—$C_5H_{11}$(n) | 567 | 0.72 |
| 204 | OH | $NH_2$ | H | —⟨H⟩—$C_4H_9$(n) | 546 | 0.74 |
| 205 | OH | OH | H | —⟨H⟩—$C_4H_9$(n) | 512 | 0.74 |

TABLE 4-continued
| No. | Y² | Y³ | Y⁷ | W | λ_max (nm) | S |
|---|---|---|---|---|---|---|
| 206 | NH₂ | NH₂ | H | 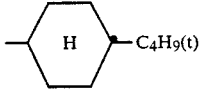 | 637 | 0.76 |
| 207 | NH₂ | OH | H | 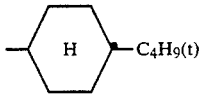 | 568 | 0.72 |
| 208 | NH₂ | NH₂ | H | 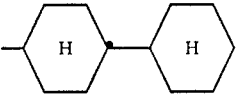 | 638 | 0.77 |
| 209 | NH₂ | NH₂ | H | 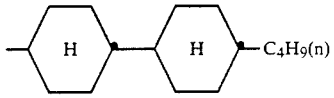 | 638 | 0.78 |
| 210 | NH₂ | NH₂ | H | 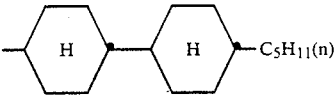 | 638 | 0.78 |
| 211 | NH₂ | OH | H | 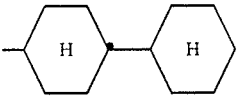 | 568 | 0.73 |
| 212 | NH₂ | NH₂ | H | 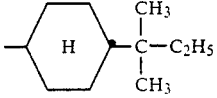 | 639 | 0.75 |
| 213 | NH₂ | NH₂ | H | 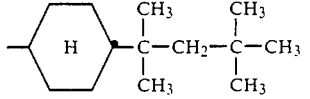 | 638 | 0.76 |
| 214 | NH₂ | NH₂ | H | 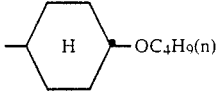 | 638 | 0.73 |
| 215 | NH₂ | OH | H | 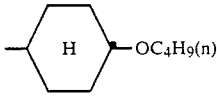 | 568 | 0.73 |
| 216 | NH₂ | NH₂ | H | 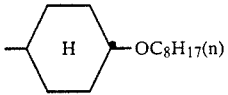 | 638 | 0.72 |
| 217 | NH₂ | NH₂ | H | 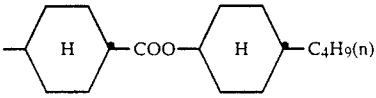 | 637 | 0.78 |
| 218 | NH₂ | NH₂ | CN | 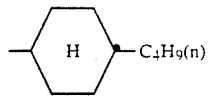 | 658 | 0.73 |

TABLE 4-continued

| No. | Y² | Y³ | Y⁷ | W | $\lambda_{max}$ (nm) | S |
|---|---|---|---|---|---|---|
| 219 | NH₂ | NH₂ | CN | —⟨H⟩—⟨H⟩ | 659 | 0.73 |
| 220 | NH₂ | NH₂ | CN | —⟨H⟩—⟨H⟩—OC₄H₉(n) | 659 | 0.75 |
| 221 | OH | NH₂ | H | —⟨H⟩—C₃H₇(n) | 546 | 0.73 |
| 222 | OH | NH₂ | H | —⟨H⟩—C₅H₁₁(n) | 546 | 0.74 |
| 223 | OH | NH₂ | H | —⟨H⟩—C₈H₁₇(n) | 546 | 0.73 |
| 224 | OH | NH₂ | H | —⟨H⟩—C(CH₃)(C₂H₅)(CH₃) | 547 | 0.72 |
| 225 | OH | NH₂ | H | —⟨H⟩—⟨H⟩ | 547 | 0.74 |

In the above, the same host liquid crystals as used in Example 1 were used.

EXAMPLE 3

As the pleochroic dye, anthraquinone dyes represented by the formula:

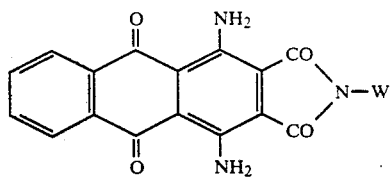

wherein W is as listed in Table 5, were used. These dyes were produced, for example, by reacting a compound of the formula:

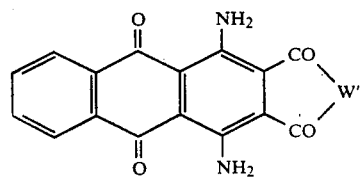

wherein W' is an oxygen atom or <NH, with a compound of the formula: H₂N—W, wherein W is as defined above. The purity of the reaction product can be increased by a conventional purification means such as column chromatography, recrystallization, sublimation, etc.

Table 5 shows the maximum absorption wavelength ($\lambda_{max}$), the order parameter (S) and two color ratio (A ∥ /A⊥) of each dye measured in the same manner as described in Example 1 using the same host liquid crystals as used in Example 1.

TABLE 5

| No. | W | $\lambda_{max}$ (nm) | S | Ratio of $A_{///}A_\perp$ |
|---|---|---|---|---|
| 226 | —⟨H⟩—C₄H₉(n) | 678 | 0.74 | 9.5 |
| 227 | —⟨H⟩—CH(CH₃)₂ | 679 | 0.73 | 9.3 |
| 228 | —⟨H⟩—C(CH₃)₂—CH₂—C(CH₃)₃ | 678 | 0.74 | 9.4 |
| 229 | —⟨H⟩—⟨H⟩ | 680 | 0.75 | 10.2 |
| 230 | —⟨H⟩—OC₄H₉(n) | 679 | 0.73 | 9.0 |

TABLE 5-continued

| No. | W | λ_max (nm) | S | Ratio of A///A⊥ |
|---|---|---|---|---|
| 231 | —⟨H⟩—OC$_8$H$_{17}$(n) | 678 | 0.72 | 8.7 |
| 232 | —⟨H⟩—⟨H⟩—C$_5$H$_{11}$(n) | 680 | 0.76 | 10.1 |

EXAMPLE 4

A liquid crystal composition prepared by adding 1.22% by weight of the dye No. 200 in Table 4 to the same host liquid crystals as used in Example 1 was sealed in the same display device as used in Example 1 (the gap between the substrates being about 10 μm). The absorption spectra were measured in the same manner as described in Example 1. The resulting spectra are shown in FIG. 2. In FIG. 2, the curve i shows A ∥ and the curve ii shows A⊥. The maximum absorption wavelength in the visible light range was 638 nm, A ∥ at the maximum absorption wavelength was 0.655 and A⊥ at the maximum absorption wavelength was 0.060. Thus, the order parameter S became 0.77. The melting point of the dye used in this Example was 147°-148° C.

In the next place, in order to test light stability of the dye used in this Example, the display device mentioned above was subjected to a test using a sunshine weather meter. In such a case, the display device was covered with a filter for preventing ultraviolet light. The conditions of the weather meter were temperature at about 50° C. without moistening nor water spray. For comparison, the same light stability test as mentioned above was conducted under the same conditions using a dye of the formula:

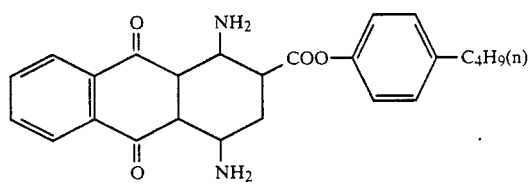

(hereinafter referred to as "dye A").

The consumed current at alternating electric current of 32 Hz after 100 hours' accelerated weathering test by the weather meter was increased 3 times or more as large as the initial value in the case of the display device containing the dye A, whereas the increasing rate was less than twice of the initial value in the case of the display device containing the dye according to this invention.

As mentioned above, when the dye according to this invention wherein a trans-4-substituted cyclohexane ring is introduced into a pleochroic dye in place of a benzene ring as a substituent is used, the increasing rate of consumed current can be suppressed in lower level than the conventionally used dye having a similar structure in the photo-weathering test.

EXAMPLE 5

A liquid crystal composition prepared by adding 1.14% by weight of the dye No. 208 in Table 4 to the same host liquid crystals as used in Example 1 was sealed in the same display device as used in Example 1 (the gap between the substrates being about 10 μm). The absorption spectra were measured in the same manner as described in Example 1. The resulting spectra are shown in FIG. 3. In FIG. 3, the curve iii shows A ∥ and the curve iv shows A⊥. The maximum absorption wavelength in the visible light range was 638 nm, A ∥ at the maximum absorption wavelength was 0.613 and A⊥ at the maximum absorption wavelength was 0.056. Thus, the order parameter S became 0.77.

EXAMPLE 6

A liquid crystal composition prepared by adding 0.77% by weight of the dye No. 218 in Table 4 to the same host liquid crystals as used in Example 1 was sealed in the same display device as used in Example 1 (the gap between the substrates being about 10 μm). The absorption spectra were measured in the same manner as described in Example 1. The resulting spectra are shown in FIG. 4. In FIG. 4, the curve v shows A ∥ 0 and the curve vi shows A⊥. The maximum absorption wavelength in the visible light range was 658 nm, A ∥ at the maximum absorption wavelength was 0.439 and A⊥ at the maximum absorption wavelength was 0.048. Thus, the order parameter S became 0.73.

EXAMPLE 7

In order to know practical stability of the guest dyes used in the liquid crystal compositions of this invention, an accelerated weathering test was conducted. Individual liquid crystal compositions dissolving the dyes of Examples 1 to 3 in the same manner as mentioned above were sealed in display devices. The resulting display devices were allowed to stand in a sunshine weather meter for about 100 hours and the decreasing rate of absorbances was measured. For comparison, typical known dyes were also sealed in display devices in the same manner as mentioned above and subjected to the same accelerated weathering test as mentioned above. The light source used in the sunshine weather meter was a carbon-arc lamp and the conditions in the sample room were the temperature about 50° C. and the moisture about 90%. The weathering tests were conducted by protecting the display devices using a filter for preventing ultraviolet light.

The results of the accelerated weathering tests using the weather meter are shown in FIG. 5. In the graph of FIG. 5, the ratio of A/Ai wherein A is absorbance at a later time and Ai is initial absorbance is taken on the ordinate axis and the accelerated weathering time is taken on the abscissa axis. In FIG. 5, the curve vii shows change of absorbances in the case wherein the dyes of Examples 1 to 3 are used, the curve viii shows that in the case wherein there is used an azo dye (the dye B) of the formula:

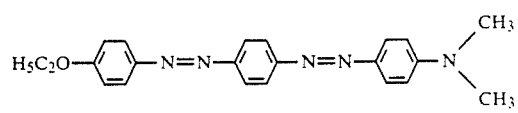

and the curve ix shows that in the case wherein there is used an azo dye (the dye C) of the formula:

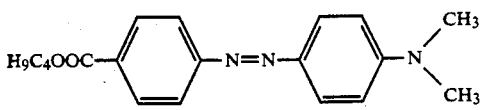

As is clear from FIG. 5, the dyes according to this invention can give better stability to the display devices than the known dyes represented by the dyes B and C mentioned above.

What is claimed is:

1. A guest-host type liquid crystal composition which comprises:
   one or more host liquid crystals, said liquid crystals being in the nematic state, or in the cholesteric state by the addition of at least one optically active substance, and
   one or more pleochroic dyes, including at least one pleochroic dye which has a trans-4-substituted cyclohexyl group, said one or more pleochroic dyes being dissolved in said host liquid crystals, the pleochroic dye having a trans-4-substituted cyclohexyl group being present in an amount of 70% or more in said one or more pleochroic dyes, wherein the dye having a trans-4-substituted cyclohexyl group is represented by the formula:

D—B$_l$W  (I)

wherein W is a trans-4-substituted cyclohexyl group; D is a grouping of organic dye containing no ionic group, B is —COO—; and l is an integer of 1.

2. A guest-host type liquid crystal composition which comprises:
   one or more host liquid crystals, said liquid crystals being in the nematic state, or in the cholesteric state by the addition of at least one optically active substance, and
   one or more pleochroic dyes, including at least one pleochroic dye which has a trans-4-substituted cyclohexyl group, said one or more pleochroic dyes being dissolved in said host liquid crystals, the pleochroic dye having a trans-4-substituted cyclohexyl group being present in an amount of 70% or more in said one or more pleochroic dyes, wherein the dye having a trans-4-substituted cyclohexyl group is represented by the formula:

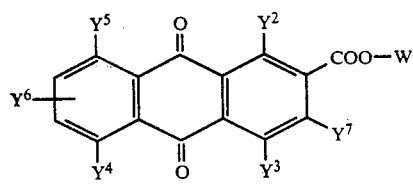

wherein W is a trans-4-substituted cyclohexyl group, $Y^2$, $Y^3$, $Y^4$ and $Y^5$ are independently a hydrogen atom, an amino group, or a hydroxyl group, and at least one of them is either an amino group or a hydroxyl group; $Y^6$ is a hydrogen atom, a halogen atom, an alkoxy group, or a group of the formula: —COOW; and $Y^7$ is a hydrogen atom, a halogen atom, or a cyano group.

3. A guest-host type liquid crystal composition which comprises:
   one or more host liquid crystals, said liquid crystals being in the nematic state, or in the cholesteric state by the addition of at least one optically active substance, and
   one or more pleochroic dyes, including at least one pleochroic dye which has a trans-4-substituted cyclohexyl group, said one or more pleochroic dyes being dissolved in said host liquid crystals, the pleochroic dye having a trans-4-substituted cyclohexyl group being present in an amount of 70% or more in said one or more pleochroic dyes, wherein the dye having a trans-4-substituted cyclohexyl group is represented by the formula:

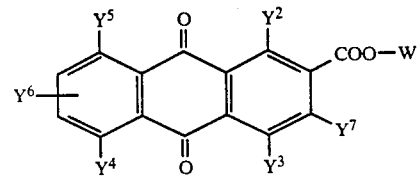

wherein W is a trans-4-substituted cyclohexyl group; $Y^2$; $Y^3$; $Y^4$ and $Y^5$ are independently a hydrogen atom, an amino group, or a hydroxyl group, and at least one of them is either an amino group or a hydroxyl group; $Y^6$ is a hydrogen atom, a halogen atom, an alkoxy group, or a group of the formula: —COOW; and $Y^7$ is a hydrogen atom, a halogen atom, or a cyano group, whereby use of said at least one pleochroic dye having a trans-4-substituted cyclohexyl group in an amount of 70% or more improves the S-value as compared with a 50:50% mixture of cis-and trans- isomers.

4. A guest-host type liquid crystal composition according to claim 1, wherein the dye having a trans-4-substituted cyclohexyl group is at least one member selected from the group consisting of anthraquinone dyes, azo dyes, azomethine dyes, quinophthalone dyes, perynone dyes, thioindigo dyes, naphthalimide dyes and oxazine dyes.

5. A guest-host type liquid crystal composition according to claim 1, wherein the D in the formula (I) is represented by the formula:

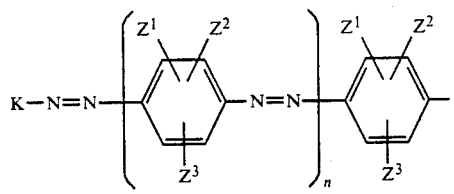

wherein K is a group of the formula:

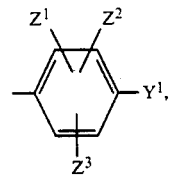

or a nitrogen-containing heterocyclic group; $Y^1$ is a hydrogen atom, an alkyl group, a cycloalkyl group, an alkoxy group, a nitro group, a cyano group, a carboxylic acid ester group, an acyloxy group, an alkylsulfonyl group, an aryl group, a halogen atom, a group of the formula: —B$_l$W in which B, W and l are as defined in claim 1, or

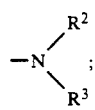

$R^2$ and $R^3$ are independently a hydrogen atom or an alkyl group or $R^2$ and $R^3$ may form together with each other a nitrogen-containing ring; $Z^1$, $Z^2$ and $Z^3$ are independently a hydrogen atom, a halogen atom, a methyl group, a hydroxyl group, a methoxy group, or a cyano group, or at least one of $Z^1$ to $Z^3$ may form together with $R^2$ and $R^3$ a part of a julolidine ring, or $Z^1$ and $Z^2$ may form a part of a naphthalene ring by combining each other; and n is zero or an integer of 1 or 2.

6. A guest-host type liquid crystal composition according to claim 1, wherein the D in the formula (I) is represented by the formula:

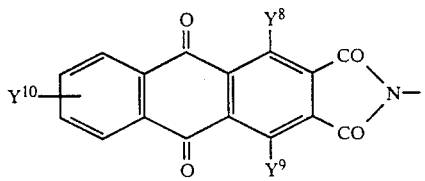

wherein $Y^8$ and $Y^9$ are independently an amino group or a hydroxyl group; $Y^{10}$ is a hydrogen atom, a halogen atom or an alkoxy group.

7. A guest-host type liquid crystal composition according to claim 1, wherein the D in the formula (I) is represented by the formula:

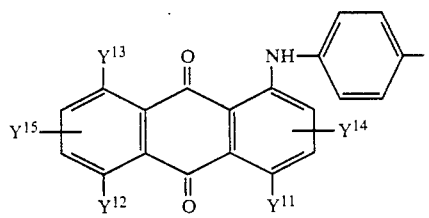

wherein $Y^{11}$ and $Y^{13}$ are independently a hydrogen atom, an amino group, or a hydroxyl group; $Y^{12}$ is a hydrogen atom, an amino group, a hydroxyl group or a group of the formula:

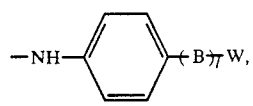

in which B, W and l are as defined in claim 1; and $Y^{14}$ and $Y^{15}$ are independently a hydrogen atom, a halogen atom, or an alkoxy group.

8. A guest-host type liquid crystal composition according to claim 1, wherein the D in the formula (I) is represented by the formula:

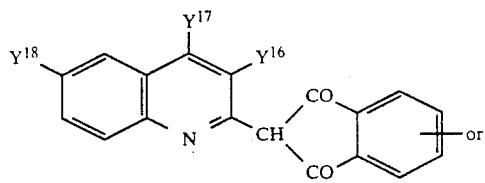

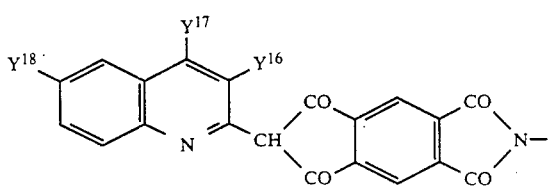

wherein $Y^{16}$ is a hydrogen atom or a hydroxyl group; $Y^{17}$ is a hydrogen atom or a halogen atom; $Y^{18}$ is a hydrogen atom, an alkyl group, an alkoxy group or a group of the formula; $-\!\!+\!B_l W$, in which B, W and l are as defined in claim 1.

9. A guest-host type liquid crystal composition according to claim 1, wherein the D in the formula (I) is represented by the formula:

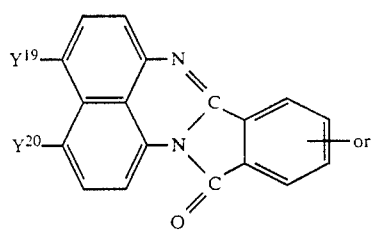

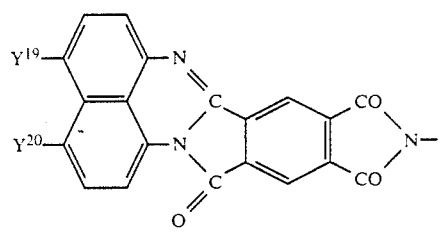

wherein $Y^{19}$ and $Y^{20}$ are independently a hydrogen atom, a group of the formula:

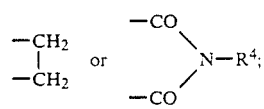

$R^4$ is an alkyl group or a group of the formula: $-\!\!+\!B_l W$, in which B, W and l are as defined in claim 1.

10. A guest-host type liquid crystal composition according to claim 1, wherein the D in the formula (I) is represented by the formula:

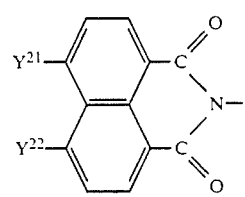

wherein $Y^{21}$ and $Y^{22}$ are independently a group of the formula:

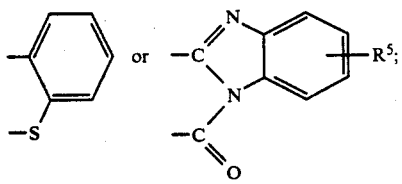

$R^5$ is a hydrogen atom, a halogen atom, an alkoxy group or a group of the formula: —B/W in which B, W and l are as defined in claim 1.

11. A guest-host type liquid crystal composition according to claim 1, wherein the D in the formula (I) is represented by the formula:

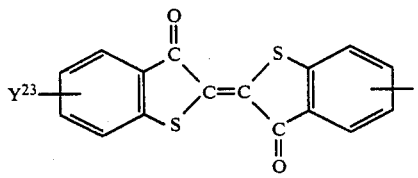

wherein $Y^{23}$ is a hydrogen atom; an alkyl group or an alkoxy group.

12. A guest-host type liquid crystal composition according to claim 1, wherein the D in the formula (I) is represented by the formula:

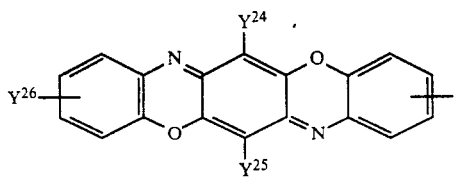

wherein $Y^{24}$ and $Y^{25}$ are independently a hydrogen atom, or a halogen atom; $Y^{26}$ is a hydrogen atom or an alkoxy group, an acyloxy group or a group of the formula: —B/W, in which B, W and l are as defined in claim 1.

13. A guest-host type liquid crystal composition according to claim 2, wherein $Y^4$, $Y^5$ and $Y^6$ are each a hydrogen atom, and $Y^2$ and $Y^3$ are each an amino group, $Y^7$ is hydrogen or a cyano group, and said trans-4-substituted cyclohexyl group is

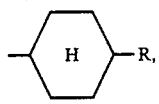

where R is an alkyl group.

14. A guest-host type liquid crystal composition according to claim 13, wherein said R is an alkyl group of $C_1$-$C_{18}$.

15. A guest-host type liquid crystal composition according to claim 13, wherein $Y^7$ is hydrogen, and wherein R is $C_4H_9(n)$.

16. A guest-host type liquid crystal composition according to claim 15, wherein the host liquid crystal is a mixture of:

(a) C₃H₇—[H]—[benzene]—CN
38.4% by weight;

(b) C₅H₁₁—[H]—[benzene]—CN
34.2% by weight;

(c) C₇H₁₅—[H]—[benzene]—CN
18.1% by weight;

and (d) C₅H₁₁—[H]—[benzene]—[benzene]—CN
9.3% by weight.

17. A guest-host type liquid crystal composition according to claim 2, wherein $Y^4$, $Y^5$ and $Y^6$ are each a hydrogen atom.

18. A guest-host type liquid crystal composition according to claim 17, wherein the substituent at the 4-position of said trans-4-substituted cyclohexyl group is selected from the group consisting of an alkyl group, a cycloalkyl group and an alkoxy group.

19. A guest-host type liquid crystal composition according to claim 1, wherein the one or more host liquid crystals have a net positive dielectric anisotropy.

20. A guest-host type liquid crystal composition according to claim 19, wherein the one or more host liquid crystals are at least one liquid crystal selected from the group consisting of cyclohexylcyclohexane series, phenylcyclohexane series, biphenyl series, terphenyl series, cyclohexylcyclohexanoate series, phenylcyclohexylcarboxylate series, ester series, diester series, cyclohexylbiphenyl series, biphenylcyclohexylcarboxylate series, biphenyl ester series, thioester series, Schiff base series, pyrimidine series, dioxane series, cyclohexylmethyl ether series and cynnamoyl nitrile series.

21. A guest-host type liquid crystal composition according to claim 20, wherein the one or more host liquid crystals include said at least one liquid crystal and at least one liquid crystal with negative dielectric anisotropy mixed with said at least one liquid crystal, the mixture having a net positive dielectric anisotropy.

22. A guest-host type liquid crystal composition according to claim 19, wherein the host liquid crystal is one of the following mixtures of (I) and (II):

(I)

(a) C₃H₇—[H]—[benzene]—CN;
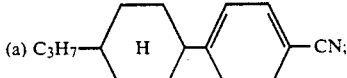

(b) C₅H₁₁—[H]—[benzene]—CN;
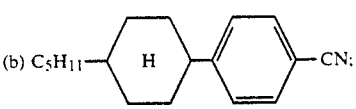

-continued

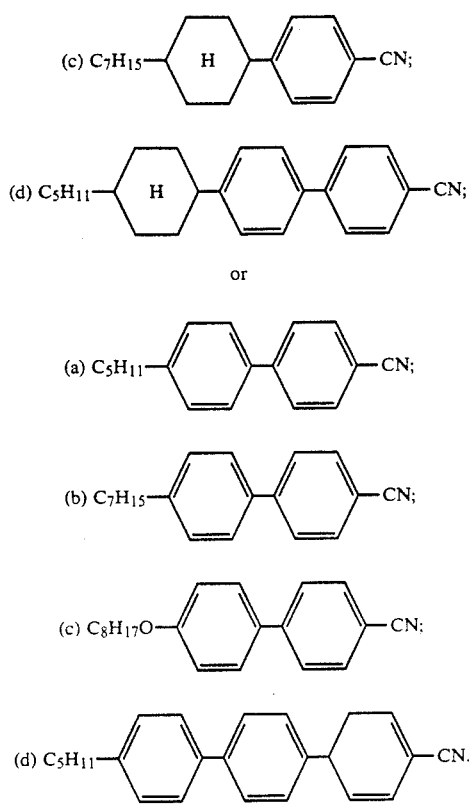

23. A guest-host type liquid crystal composition according to claim 20, wherein the at least one optically active substance is selected from the group consisting of chiral nematic compounds formed by introducing an optically active group into nematic liquid crystal compounds; alcohol derivatives; ketone derivatives; carboxylic acid derivatives; aldehyde derivatives; alkene derivatives; amines; amides; and nitrate derivatives.

24. A guest-host type liquid crystal composition according to claim 23, wherein the dye having a trans-4-substituted cyclohexyl group is at least one member selected from the group consisting of anthraquinone dyes, azo dyes, azomethine dyes, quinophthalene dyes, perynone dyes, thio-indigo dyes, naphthalimide dyes and oxazine dyes.

25. A guest-host type liquid crystal composition according to claim 24, wherein the substituent at the 4-position in the trans-4-substituted cyclohexyl group is selected from the group consisting of an alkyl group, a cycloalkyl group, and an alkoxy group.

26. A guest-host type liquid crystal composition according to claim 25, consisting of said one or more host liquid crystals and said one or more pleochroic dyes.

27. A guest-host type liquid crystal composition according to claim 25, wherein said alkyl group has $C_1$-$C_{18}$; said cycloalkyl group is a cyclohexyl group or substituted cyclohexyl group; and said alkoxy group has from 1 to 18 carbon atoms.

28. A guest-host type liquid crystal composition according to claim 27, wherein said substituted cyclohexyl group is a trans-4-substituted cyclohexyl group, the substituent being a butyl or pentyl group.

29. A guest-host type liquid crystal composition according to claim 18, wherein said alkyl group has $C_1$-$C_{18}$; said cycloalkyl group is a cyclohexyl group or substituted cyclohexyl group; and said alkoxy group has from 1 to 18 carbon atoms.

30. A guest-host type liquid crystal composition according to claim 29, wherein said substituted cyclohexyl group is a trans-4-substituted cyclohexyl group, the substituent being a butyl or pentyl group.

31. A guest-host type liquid crystal composition according to claim 1, wherein the substituent at the 4-position of said trans-4-substituted cyclohexyl group is selected from the group consisting of an alkyl group, a cycloalkyl group and an alkoxy group.

32. A guest-host type liquid crystal composition according to claim 31, wherein said alkyl group has $C_1$-$C_{18}$; said cycloalkyl group is a cyclohexyl group or substituted cyclohexyl group; and said alkoxy group has from 1 to 18 carbon atoms.

33. A guest-host type liquid crystal composition according to claim 32, wherein said substituted cyclohexyl group is a trans-4-substituted cyclohexyl group, the substituent being a butyl or pentyl group.

34. A guest-host type liquid crystal composition according to claim 1, wherein said one or more pleochroic dyes contain said at least one pleochroic dye which has a trans-4-substituted cyclohexyl group in an amount of 100% of said one or more pleochroic dyes.

35. A guest-host type liquid crystal composition according to claim 1, wherein the host liquid crystal is a mixture of:

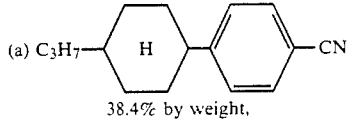
38.4% by weight,

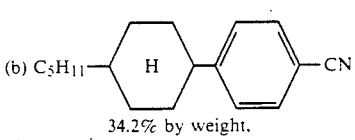
34.2% by weight,

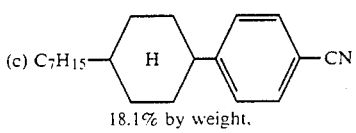
18.1% by weight,

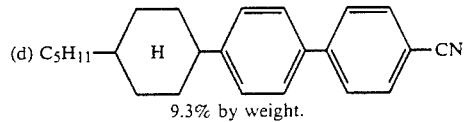
9.3% by weight.

36. A guest-host type liquid crystal composition according to claim 2, wherein the host liquid crystal is a mixture of:

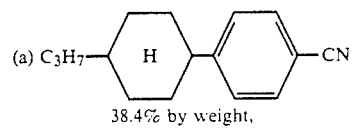
38.4% by weight,

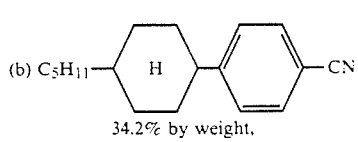
34.2% by weight,

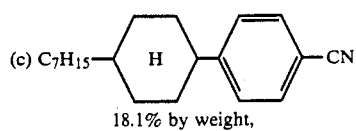

(c) 18.1% by weight,

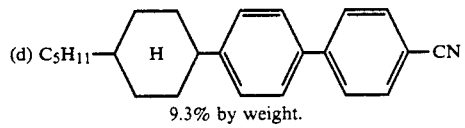

(d) 9.3% by weight.

37. A guest-host type liquid crystal composition according to claim 36, wherein $Y^4$, $Y^5$ and $Y^6$ are hydrogen.

38. A guest-host type liquid crystal composition according to claim 37, wherein the substituent at the 4-position in the trans-4-substituted cyclohexyl group is selected from the group consisting of an alkyl group, a cycloalkyl group, and an alkoxy group.

39. A guest-host type liquid crystal composition according to claim 38, wherein said alkyl group has $C_1$–$C_{18}$; said cycloalkyl group is a cyclohexyl or substituted cyclohexyl group; and said alkoxy group has from 1–18 carbon atoms.

40. A guest-host type liquid crystal composition according to claim 39, wherein said alkyl group has $C_1$–$C_8$; the substituted cyclohexyl group is a trans-4-substituted cyclohexyl group with the substituent being an alkyl group of $C_1$–$C_5$ or an alkoxy group of $C_1$–$C_4$; and said alkoxy group has $C_1$–$C_8$.

41. A guest-host type liquid crystal composition according to claim 37, wherein said trans-4-substituted cyclohexyl group is

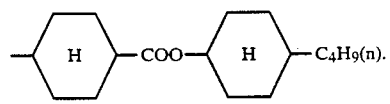

* * * * *